(12) United States Patent
Sitler et al.

(10) Patent No.: US 12,180,743 B2
(45) Date of Patent: Dec. 31, 2024

(54) BUCKLING-RESTRAINED BRACE AND SEISMIC FORCE-RESISTING STRUCTURE

(71) Applicant: NIPPON STEEL ENGINEERING CO., LTD., Tokyo (JP)

(72) Inventors: Benjamin Jacob Sitler, Tokyo (JP); Masao Terashima, Tokyo (JP); Toru Takeuchi, Tokyo (JP); Yuki Terazawa, Tokyo (JP); Ryota Matsui, Sapporo (JP)

(73) Assignee: NIPPON STEEL ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 18/007,271

(22) PCT Filed: Aug. 10, 2022

(86) PCT No.: PCT/JP2022/030656
§ 371 (c)(1),
(2) Date: Jan. 27, 2023

(87) PCT Pub. No.: WO2023/037820
PCT Pub. Date: Mar. 16, 2023

(65) Prior Publication Data
US 2024/0263478 A1    Aug. 8, 2024

(30) Foreign Application Priority Data
Sep. 8, 2021  (JP) .................. 2021-146200

(51) Int. Cl.
*E04H 9/02*    (2006.01)
*F16F 7/12*    (2006.01)
*F16F 15/04*   (2006.01)

(52) U.S. Cl.
CPC ............ *E04H 9/0237* (2020.05); *F16F 7/12* (2013.01); *F16F 15/04* (2013.01)

(58) Field of Classification Search
CPC ......... E04H 9/0237; E04H 9/02; E04H 9/024; F16F 7/12; F16F 15/04; E04B 1/58
See application file for complete search history.

(56) References Cited

U.S. PATENT DOCUMENTS 7,174,680 B2 * 2/2007 Smelser .................... E04C 3/02
52/167.3
7,185,462 B1 * 3/2007 Smelser ................ E04H 9/0237
52/638

(Continued)

FOREIGN PATENT DOCUMENTS

CN    103938748 B    4/2016
JP    H05113054 A    5/1993

(Continued)

OTHER PUBLICATIONS

International Search Report for PCT/JP2022/030656, mailed on Sep. 20, 2022.

*Primary Examiner* — Adriana Figueroa
(74) *Attorney, Agent, or Firm* — Rabin & Berdo, P.C.

(57) ABSTRACT

A buckling-restrained brace includes a core and a restrainer, the core includes a first steel plate having a first yield point, a second steel plate having a second yield point different from the first yield point, and a third steel plate having a third yield point different from the first yield point, the first steel plate is sandwiched between the second steel plate and the third steel plate, and a length of a first yielding segment of the first steel plate in the axial direction is different from a length of the second yielding segment of the second steel plate in the axial direction, and is different from a length of the third yielding segment of the third steel plate in the axial direction.

18 Claims, 17 Drawing Sheets

(56) References Cited

U.S. PATENT DOCUMENTS

| | | | | |
|---|---|---|---|---|
| 7,305,799 | B2 * | 12/2007 | Smelser | E04C 3/02 |
| | | | | 52/855 |
| 9,016,007 | B2 * | 4/2015 | Marinovic | E04H 9/024 |
| | | | | 52/167.3 |
| 9,593,504 | B2 * | 3/2017 | Marinovic | E04H 9/0237 |
| 10,006,202 | B2 * | 6/2018 | Kimura | E04B 1/98 |
| 10,858,827 | B2 * | 12/2020 | Hou | E04B 1/98 |

FOREIGN PATENT DOCUMENTS

| | | | |
|---|---|---|---|
| JP | 2000170247 | A | 6/2000 |
| JP | 2007191987 | A | 8/2007 |
| JP | 2009161937 | A | 7/2009 |
| JP | 2014234677 | A | 12/2014 |
| JP | 2015105482 | A | 6/2015 |
| JP | 2016075037 | A | 5/2016 |

* cited by examiner

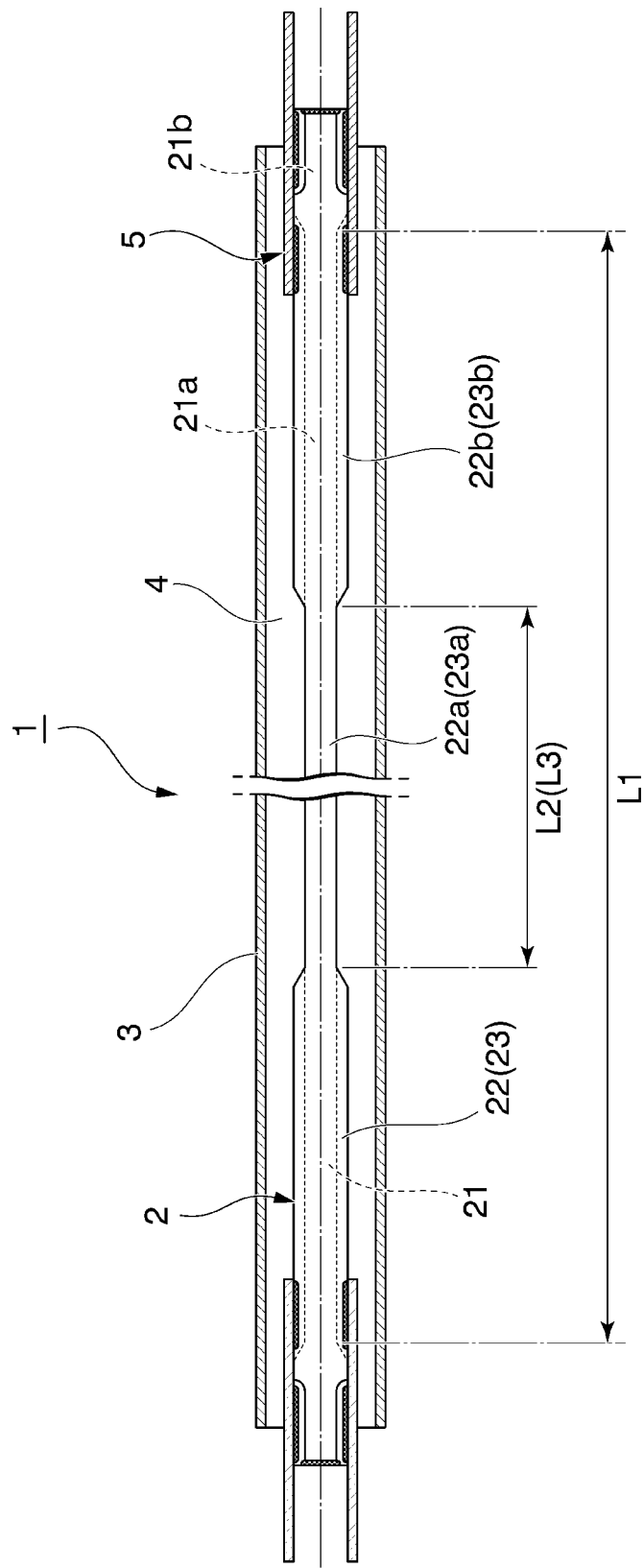

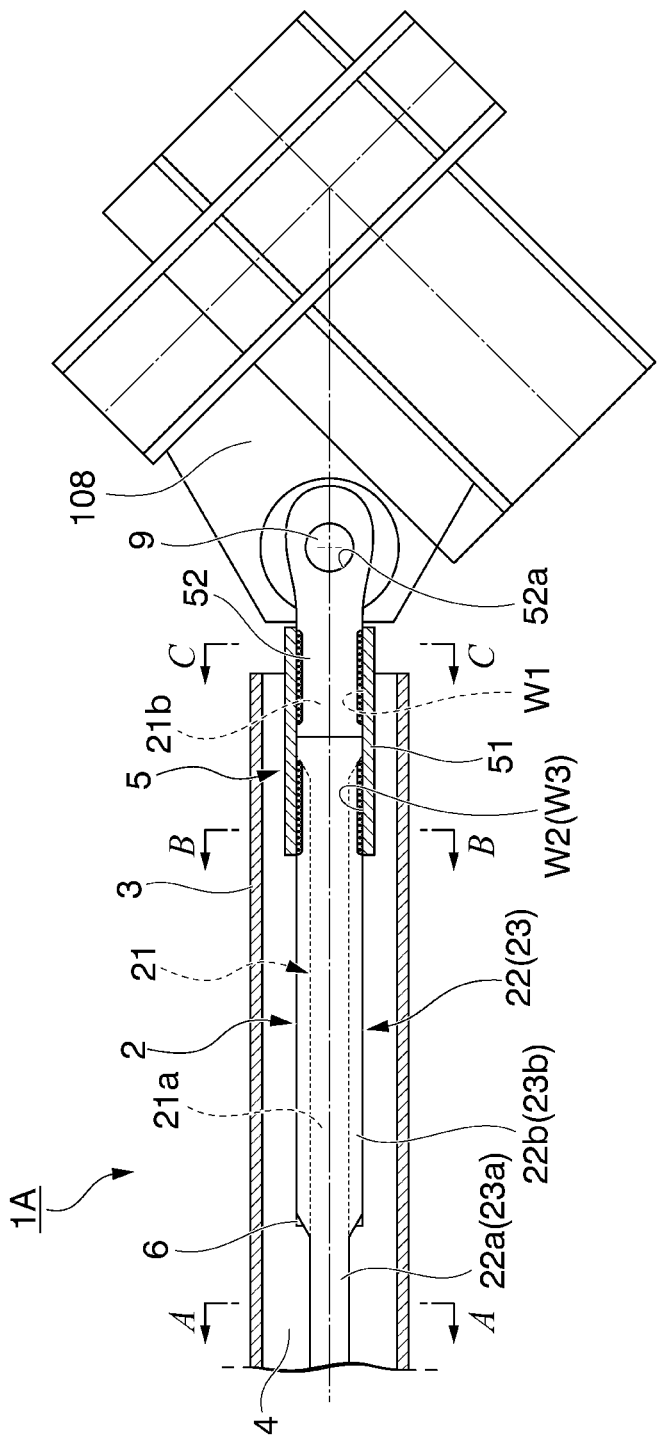

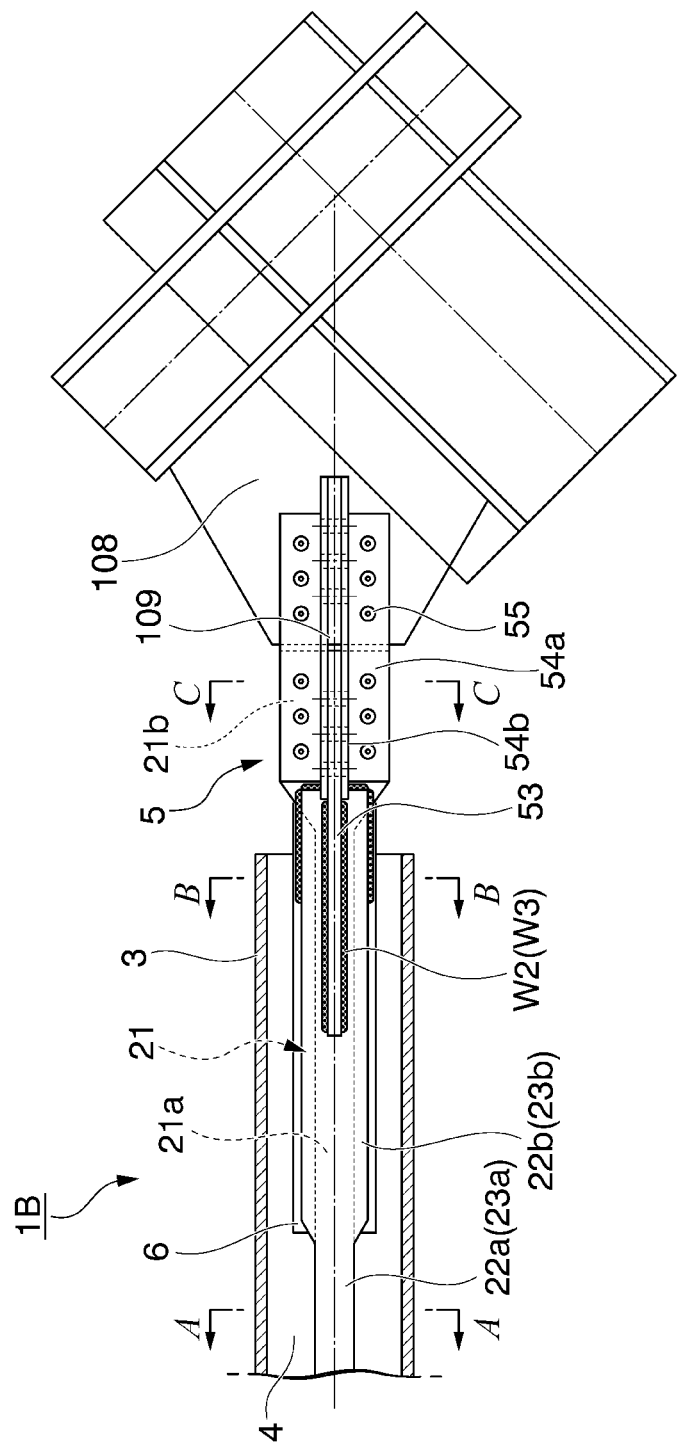

BUCKLING-RESTRAINED BRACE AND SEISMIC FORCE-RESISTING STRUCTURE

TECHNICAL FIELD

The present invention relates to a buckling-restrained brace and a seismic force-resisting structure.

Priority is claimed on Japanese Patent Application No. 2021-146200, filed Sep. 8, 2021, the content of which is incorporated herein by reference.

BACKGROUND ART

Conventionally, a buckling-restrained brace is used as a reinforcing member for buildings and bridge structures. In the buckling-restrained brace, a core that receives an axial force is restrained by a restrainer or the like from the outer sides thereof. Accordingly, the core yields and deforms while non-axial deformation and buckling are suppressed. By installing the buckling-restrained brace in a building or bridge structure, the earthquake-resistance and energy-dissipation performance of the structure is improved.

Patent Document 1 discloses a buckling-restrained brace in which two types of steel plates having different yield points are used in a core. The two types of steel plates yield at different yield points, and thus the buckling-restrained brace absorbs seismic energy of different magnitudes of earthquakes more efficiently.

CITATION LIST

Patent Document

[Patent Document 1]
Chinese Patent No. 103938748

SUMMARY OF INVENTION

Technical Problem

If large residual drift remains in a building or bridge structure after the buckling-restrained brace has received a plastic axial deformation due to an earthquake or the like, there is a possibility that continuous use of the structure may be impossible. Therefore, in a buckling-restrained brace, it is desirable to reduce residual drift after receiving a plastic axial deformation due to an earthquake or the like Further, it is desirable to secure the strength of the buckling-restrained brace itself.

The present invention has been made in view of the above circumstances, and the objective thereof is to provide a buckling-restrained brace and a seismic force-resisting structure that can reduce residual drift after receiving an axial deformation due to an earthquake or the like while securing the strength of the buckling-restrained brace itself.

Solution to Problem

A buckling-restrained brace according to a first aspect of the present invention includes a core extending in an axial direction, and a restrainer encasing the core from an outer side thereof in a state where both end segments of the core in the axial direction protrude from the restrainer, in which the core includes a first steel plate having a first yield point, a second steel plate having a second yield point different from the first yield point, and a third steel plate having a third yield point different from the first yield point, the first steel plate being sandwiched between the second steel plate and the third steel plate, the first steel plate includes a first yielding segment provided in a center segment of the first steel plate in the axial direction and having an axial strength smaller than an axial strength of both end segments of the first steel plate in the axial direction, the second steel plate includes a second yielding segment provided in a center segment of the second steel plate in the axial direction and having an axial strength smaller than an axial strength of both end segments of the second steel plate in the axial direction, the third steel plate includes a third yielding segment provided in a center segment of the third steel plate in the axial direction and having an axial strength smaller than an axial strength of both end segments of the third steel plate in the axial direction, and a length of the first yielding segment in the axial direction is different from a length of the second yielding segment in the axial direction, and is different from a length of the third yielding segment in the axial direction.

The core includes two types of steel plates having different yield points. Accordingly, in a drift region where the axial deformation applied to the core is within a predetermined range, among the first to third steel plates, the steel plate having a relatively low yield point yields, but the steel plate having a relatively high yield point remains elastic. In the drift region, since the steel plate having the relatively high yield point remains elastic, the tangent stiffness of the entire buckling-restrained brace is high, and therefore the residual drift of the buckling-restrained brace can be reduced. Further, by making the length of the first yielding segment in the axial direction be different from the length of the second yielding segment in the axial direction and be different from the length of the third yielding segment in the axial direction, it is possible to increase the ratio of steel plate yield deformations. As a result, the effect of reducing the residual drift of the buckling-restrained brace when receiving the plastic axial deformation due to an earthquake or the like can be enhanced.

Further, by sandwiching the first steel plate between the second and third steel plates, the first steel plate is supported by the second and third steel plates, and the second and third steel plates are supported by the first steel plate. Therefore, even when the lengths of the yielding segments in the axial direction are changed, it is possible to restrain buckling of the yielding segments and to secure the strength of the buckling-restrained brace.

Therefore, according to the buckling-restrained brace of the present invention, it is possible to reduce the residual drift of the buckling-restrained brace after receiving an axial deformation due to an earthquake or the like while securing the strength of the buckling-restrained brace itself.

In a buckling-restrained brace according to a second aspect of the present invention, in the first aspect, the first yield point is higher than the second yield point, and is higher than the third yield point, and the length of the first yielding segment in the axial direction is longer than the length of the second yielding segment in the axial direction, and is longer than the length of the third yielding segment in the axial direction.

In a buckling-restrained brace according to a third aspect of the present invention, in the second aspect, the length of the first yielding segment in the axial direction is longer than the length of the second yielding segment in the axial direction, and is longer than the length of the third yielding segment in the axial direction such that a ratio of steel plate yield deformations is increased compared with a case where the length of the first yielding segment in the axial direction is the same as the length of the second yielding segment in the axial direction and is the same as the length of the third yielding segment in the axial direction, the ratio of steel plate yield deformations being a ratio of a second yield displacement when an axial load, at which yielding of the first steel plate occurs, is applied to the core to a first yield displacement when an axial load, at which yielding of the second steel plate or the third steel plate occurs, is applied to the core.

In a buckling-restrained brace according to a fourth aspect of the present invention, in the second or third aspect, the first steel plate is provided such that the first yielding segment protrudes from the restrainer.

In a buckling-restrained brace according to a fifth aspect of the present invention, in the first aspect, the first yield point is lower than the second yield point, and is lower than the third yield point, and the length of the first yielding segment in the axial direction is shorter than the length of the second yielding segment in the axial direction, and is shorter than the length of the third yielding segment in the axial direction.

In a buckling-restrained brace according to a sixth aspect of the present invention, in the fifth aspect, the length of the first yielding segment in the axial direction is shorter than the length of the second yielding segment in the axial direction, and is shorter than the length of the third yielding segment in the axial direction such that a ratio of steel plate yield deformations is increased compared with a case where the length of the first yielding segment in the axial direction is the same as the length of the second yielding segment in the axial direction and is the same as the length of the third yielding segment in the axial direction, the ratio of steel plate yield deformations being a ratio of a second yield displacement when an axial load, at which yielding of the second steel plate or the third steel plate occurs, is applied to the core to a first yield displacement when an axial load, at which yielding of the first steel plate occurs, is applied to the core.

In a buckling-restrained brace according to a seventh aspect of the present invention, in the fifth or sixth aspect, the second steel plate is provided such that the second yielding segment protrudes from the restrainer, and the third steel plate is provided such that the third yielding segment protrudes from the restrainer.

In a buckling-restrained brace according to an eighth aspect of the present invention, in any one of the first to seventh aspects, and in the buckling-restrained brace according to the above aspect, the first yielding segment has a width smaller than a width of both end segments of the first steel plate in the axial direction, the second yielding segment has a width smaller than a width of both end segments of the second steel plate in the axial direction, and the third yielding segment has a width smaller than a width of both end segments of the third steel plate in the axial direction.

In a buckling-restrained brace according to a ninth aspect of the present invention, in any one of the first to eighth aspects, the buckling-restrained brace further includes connectors which are provided to both end segments of the core, each of the connectors includes a first connection segment connected to the first steel plate, a second connection segment connected to the second steel plate, and a third connection segment connected to the third steel plate.

In a buckling-restrained brace according to a tenth aspect of the present invention, in any one of the second to fourth aspects, the buckling-restrained brace further includes connectors which are provided to both end segments of the core, each of the connectors includes a first connection segment connected to the first steel plate, a second connection segment connected to the second steel plate, and a third connection segment connected to the third steel plate, and the second connection segment and the third connection segment are located closer to a center in the axial direction than the first connection segment.

In a buckling-restrained brace according to an eleventh aspect of the present invention, in any one of the fifth to seventh aspects, the buckling-restrained brace further includes connectors which are provided to both end segments of the core, each of the connectors includes a first connection segment connected to the first steel plate, a second connection segment connected to the second steel plate, and a third connection segment connected to the third steel plate, and the first connection segment is located closer to a center in the axial direction than the second connection segment and the third connection segment.

In a buckling-restrained brace according to a twelfth aspect of the present invention, in any one of the ninth to eleventh aspects, the first connection segment is provided so as not to overlap the second connection segment in the axial direction, and is provided so as not to overlap the third connection segment in the axial direction.

In a buckling-restrained brace according to a thirteenth aspect of the present invention, in any one of the ninth to twelfth aspects, each of the connectors includes a pair of connection plates sandwiching the first steel plate, the second steel plate, and the third steel plate in a direction intersecting a thickness direction of the first steel plate.

In a buckling-restrained brace according to a fourteenth aspect of the present invention, in any one of the first to thirteenth aspects, the second yield point is the same as the third yield point, and the length of the second yielding segment in the axial direction is the same as the length of the third yielding segment in the axial direction.

In a buckling-restrained brace according to a fifteenth aspect of the present invention, in any one of the first to fourteenth aspects, the second steel plate and the third steel plate are symmetric in a thickness direction of the first steel plate, with respect to the thickness-center of the first steel plate in the thickness direction of the first steel plate.

In a buckling-restrained brace according to a sixteenth aspect of the present invention, in any one of the first to fifteenth aspects, the first steel plate, the second steel plate, and the third steel plate are arranged parallel to each other.

In a buckling-restrained brace according to a seventeenth aspect of the present invention, in any one of the first to sixteenth aspects, the buckling-restrained brace further includes a spacer provided between the second steel plate and the third steel plate.

A seismic force-resisting structure according to one aspect of the present invention includes a frame, a plurality of gusset plates projecting inward from the frame, and the buckling-restrained brace, the buckling-restrained brace spans between the plurality of gusset plates, and both end segments of the core are connected to the plurality of gusset plates using a welded, pinned, or bolted connection Advantageous Effects of Invention According to the present invention, it is possible to provide a buckling-restrained brace and a seismic force-resisting structure that can reduce residual drift when receiving a plastic axial deformation due to an earthquake or the like while securing the strength of the buckling-restrained brace itself.

BRIEF DESCRIPTION OF DRAWINGS

FIG. 1 is a drawing showing a buckling-restrained brace according to a first embodiment of the present invention.

FIG. 4A is a front view of an end segment on one side of a buckling-restrained brace according to a second embodiment of the present invention.

FIG. 5A is a front view of an end segment on one side of a buckling-restrained brace according to a third embodiment of the present invention.

DESCRIPTION OF EMBODIMENTS

First Embodiment

Hereinafter, a buckling-restrained brace 1 according to a first embodiment of the present invention will be described with reference to FIGS. 1 and 2A to 2D.

Figure 2A:
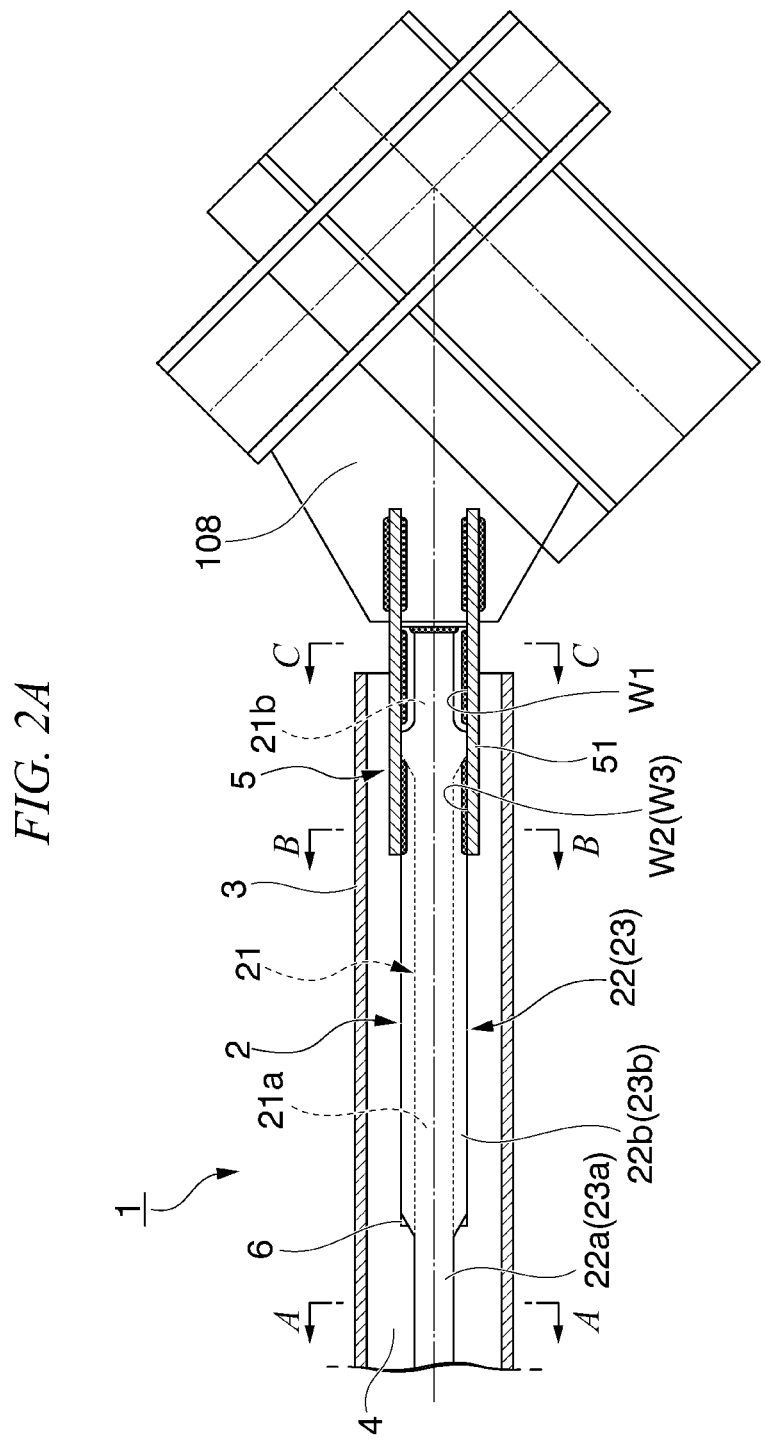
FIG. 2A is a front view of an end segment on one side of the buckling-restrained brace according to the first embodiment of the present invention.
Figure 2B:
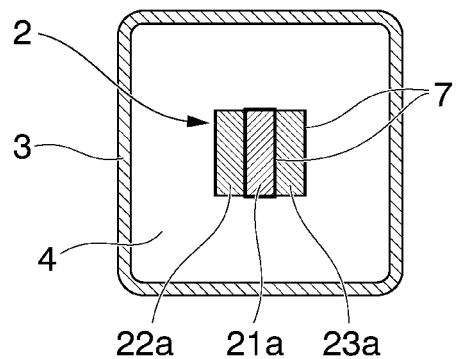
FIG. 2B is a sectional view taken along the line A-A in FIG. 2A.
Figure 2C:
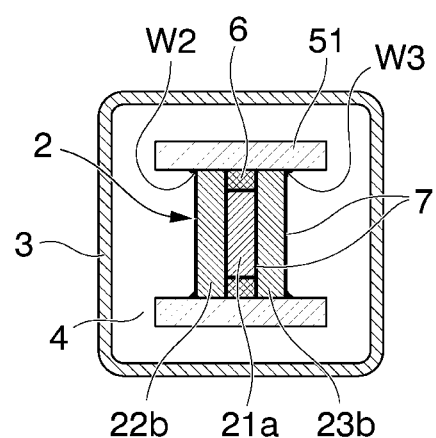
FIG. 2C is a sectional view taken along the line B-B in FIG. 2A.
Figure 2D:
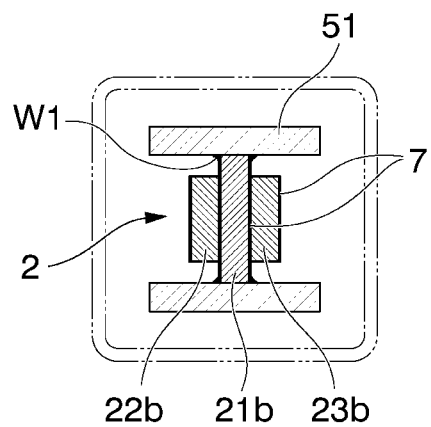
FIG. 2D is a sectional view taken along the line C-C in FIG. 2A.

FIG. 1 shows the buckling-restrained brace 1 according to the first embodiment of the present invention. FIG. 2A is a front view of an end segment on one side of the buckling-restrained brace 1, FIG. 2B is a sectional view taken along the line A-A in FIG. 2A, FIG. 2C is a sectional view taken along the line B-B in FIG. 2A, and FIG. 2D is a sectional view taken along the line C-C in FIG. 2A.

The buckling-restrained brace 1 is used, for example, for a diagonal beam in buildings and bridge structures in order to improve the earthquake-resistant and energy-dissipation performance of the buildings and bridge structures.

The buckling-restrained brace 1 includes a core 2, a restrainer 3, an infill material 4, connectors 5, spacers 6, and debonding layers 7. A direction along the axis of the buckling-restrained brace 1 is referred to as an axial direction.

The core 2 extends straight in the axial direction. The core 2 includes a high-yield-point steel plate (i.e., a first steel plate) 21, a first low-yield-point steel plate (i.e., a second steel plate) 22, and a second low-yield-point steel plate (i.e., a third steel plate) 23.

The high-yield-point steel plate 21, the first low-yield-point steel plate 22, and the second low-yield-point steel plate 23 are elongated flat plates. The first low-yield-point steel plate 22 and the second low-yield-point steel plate 23 have the same shape.

The high-yield-point steel plate 21, the first low-yield-point steel plate 22, and the second low-yield-point steel plate 23 extend straight in the axial direction. The high-yield-point steel plate 21, the first low-yield-point steel plate 22, and the second low-yield-point steel plate 23 have the same length in the axial direction. The length of the high-yield-point steel plate 21 may differ from the length of the first low-yield-point steel plate 22 and the length of the high-yield-point steel plate 21 may differ from the length of the second low-yield-point steel plate 23. The high-yield-point steel plate 21 may be longer than the first low-yield-point steel plate 22 and the second low-yield-point steel plate 23.

The high-yield-point steel plate 21, the first low-yield-point steel plate 22, and the second low-yield-point steel plate 23 are arranged parallel to each other. That is, the thickness direction of the high-yield-point steel plate 21, the thickness direction of the first low-yield-point steel plate 22, and the thickness direction of the second low-yield-point steel plate 23 are parallel to each other. Hereinafter, the thickness direction of the high-yield-point steel plate 21 may be simply referred to as a thickness direction, or as a thickness direction of the core 2. The width direction of the high-yield-point steel plate 21, the width direction of the first low-yield-point steel plate 22, and the width direction of the second low-yield-point steel plate 23 are parallel to each other. Hereinafter, the width direction of the high-yield-point steel plate 21 may be is simply referred to as a width direction, or as a width direction of the core 2. The axial direction, the thickness direction, and the width direction are orthogonal to each other.

As shown in FIGS. 2B to 2D, the first low-yield-point steel plate 22, the high-yield-point steel plate 21, and the second low-yield-point steel plate 23 are arranged to be adjacent to each other in the thickness direction. The high-yield-point steel plate 21 is sandwiched between the first low-yield-point steel plate 22 and the second low-yield-point steel plate 23 in the thickness direction. The first low-yield-point steel plate 22 and the second low-yield-point steel plate 23 are symmetric in the thickness direction, with respect to the thickness-center of the high-yield-point steel plate 21 in the thickness direction. The first low-yield-point steel plate 22, the high-yield-point steel plate 21, and the second low-yield-point steel plate 23 are stacked in the thickness direction. In the present embodiment, the high-yield-point steel plate 21, the first low-yield-point steel plate 22, and the second low-yield-point steel plate 23 have the same thickness. The thickness of the high yield-point steel plate 21 may differ from the thickness of the first low-yield point steel plate 22 and the thickness of the high-yield-point steel plate 21 may differ from the thickness of the second low-yield point steel plate 23. However, the thicknesses of the first low-yield-point steel plate 22 and the second low-yield point steel plate 23 are equal.

The high-yield-point steel plate 21 has a first yield point. The first low-yield-point steel plate 22 has a second yield point lower than the first yield point. The second low-yield-point steel plate 23 has a third yield point lower than the first yield point. The second yield point is the same as the third yield point.

The high-yield-point steel plate 21 includes a first yielding segment 21*a* provided in a center segment of the high-yield-point steel plate 21 in the axial direction, and the width of the first yielding segment 21*a* is smaller than the width of both end segments of the high-yield-point steel plate 21 in the axial direction. Segments (i.e., both end segments) other than the first yielding segment 21*a* of the high-yield-point steel plate 21 are first elastic segments 21*b* whose width is larger than the width of the first yielding segment 21*a*. The axial strength of the first yielding segment 21*a* is smaller than the axial strength of the first elastic segments 21*b*. The first yielding segment 21*a* yields more easily than the first elastic segments 21*b*.

The first low-yield-point steel plate 22 includes a second yielding segment 22*a* provided in a center segment of the first low-yield-point steel plate 22 in the axial direction, and the width of the second yielding segment 22*a* is smaller than the width of both end segments of the first low-yield-point steel plate 22 in the axial direction. Segments (i.e., both end segments) other than the second yielding segment 22*a* of the first low-yield-point steel plate 22 are second elastic segments 22*b* whose width is larger than the width of the second yielding segment 22*a*. The axial strength of the second yielding segment 22*a* is smaller than the axial strength of the second elastic segments 22*b*. The second yielding segment 22*a* yields more easily than the second elastic segments 22*b*.

The second low-yield-point steel plate 23 includes a third yielding segment 23*a* provided in a center segment of the second low-yield-point steel plate 23 in the axial direction, and the width of the third yielding segment 23*a* is smaller than the width of both end segments of the second low-yield-point steel plate 23 in the axial direction. Segments (i.e., both end segments) other than the third yielding segment 23*a* of the second low-yield-point steel plate 23 are third elastic segments 23*b* whose width is larger than the width of the third yielding segment 23*a*. The axial strength of the third yielding segment 23*a* is smaller than the axial strength of the third elastic segments 23*b*. The third yielding segment 23*a* yields more easily than the third elastic segments 23*b*.

The length L1 of the first yielding segment 21*a* in the axial direction is longer than the length L2 of the second yielding segment 22*a* in the axial direction. The length L1 of the first yielding segment 21*a* in the axial direction is longer than the length L3 of the third yielding segment 23*a* in the axial direction. The length L2 of the second yielding segment 22*a* in the axial direction is the same as the length L3 of the third yielding segment 23*a* in the axial direction.

As shown in FIG. 2B, in the center segment of the core 2 in the axial direction, the second yielding segment 22*a*, the first yielding segment 21*a*, and the third yielding segment 23*a* are arranged in the thickness direction. As shown in FIG. 2C, in a segment closer to the end of the core 2 than the segment shown in FIG. 2B, the second elastic segment 22*b*, the first yielding segment 21*a*, and the third elastic segment 23*b* are arranged in the thickness direction. As shown in FIG. 2D, in a segment further closer to the end of the core 2 than the segment shown in FIG. 2C, the second elastic segment 22*b*, the first elastic segment 21*b*, and the third elastic segment 23*b* are arranged in the thickness direction.

The widths of the yielding segments 21*a*, 22*a*, and 23*a* are smaller than the widths of the elastic segments 21*b*, 22*b*, and 23*b*. The width of the first yielding segment 21*a* is smaller than the width of the second elastic segment 22*b* and is smaller than the width of the third elastic segment 23*b*. Therefore, in the segment where the second elastic segment 22*b*, the first yielding segment 21*a*, and the third elastic segment 23*b* are arranged in the thickness direction (i.e., in the segment shown in FIG. 2C), gaps between the second elastic segment 22*b* and the third elastic segment 23*b* are formed on both sides of the first yielding segment 21*a* in the width direction. The spacers 6 are provided in the gaps. The spacers 6 are provided so as to fill the gaps. The spacers 6 are provided on the both sides of the first yielding segment 21*a* in the width direction. The spacer 6 is provided over the entire segment where the second elastic segment 22*b*, the first yielding segment 21*a*, and the third elastic segment 23*b* are arranged in the thickness direction.

The restrainer 3 is an elongated square tubular steel pipe. The restrainer 3 encases the core 2 from an outer side thereof. The length of the restrainer 3 in the axial direction is shorter than the length of the core 2 in the axial direction. Thus, both end segments of the core 2 in the axial direction protrude from the restrainer 3.

The restrainer 3 may be, for example, a cylindrical steel pipe.

The infill material 4 is filled inside the restrainer 3. The infill material 4 is filled between the core 2 and the restrainer 3. The infill material 4 is concrete, mortar, or the like. The restrainer 3 and the infill material 4 restrict the deformation (for example, in-plane buckling and out-of-plane buckling) of the core 2 in a direction other than the axial direction.

In order to prevent the infill material 4 from leaking from the ends of the restrainer 3, openings at both ends of the restrainer 3 are closed by lids (not shown).

The debonding layer 7 is provided between the core 2 and the infill material 4. The debonding layer 7 prevents the core 2 and the infill material 4 from being bonded and joined to each other. By providing the debonding layer 7, the infill material 4 supports the core 2 in a manner so that the axial force of the core 2 is not transmitted to the restrainer 3, that is, the core 2 can move relative to the restrainer 3 in the axial direction.

The debonding layers 7 are also provided between the high-yield-point steel plate 21 and the first low-yield-point steel plate 22, and between the high-yield-point steel plate 21 and the second low-yield-point steel plate 23. The debonding layers 7 prevent the adjacent steel plates 21, 22, and 23 from being bonded and joined to each other. The debonding layers 7 prevent the transmission of the axial force of the high-yield-point steel plate 21 to the first low-yield-point steel plate 22 and the second low-yield-point steel plate 23, and prevent the transmission of the axial force of the first low-yield-point steel plate 22 and the second low-yield-point steel plate 23 to the high-yield-point steel plate 21, which permits the individual steel plates 21, 22, and 23 to have different yield lengths.

Note that the debonding layers 7 provided between the high-yield-point steel plate 21 and the first low-yield-point steel plate 22, and between the high-yield-point steel plate 21 and the second low-yield-point steel plate 23 may be omitted. The material and thickness of the debonding layers 7 between the high-yield-point steel plate 21, the first low-yield-point steel plate 22 and the second low-yield-point steel plate 23 may be different than the debonding layer 7 between the infill material 4 and the high-yield-point steel plate 21, the first low-yield-point steel plate 22 and the second low-yield-point steel plate 23.

The connectors 5 are provided at both end segments of the core 2. Each connector 5 includes a pair of connection plates 51.

The core 2 (i.e., the high-yield-point steel plate 21, the first low-yield-point steel plate 22, and the second low-yield-point steel plate 23) is sandwiched between the pair of connection plates 51 in a direction intersecting the thickness direction of the high-yield-point steel plate 21. In the present embodiment, the pair of connection plates 51 sandwich the core 2 in the width direction. The connection plate 51 is provided perpendicular to the core 2 (i.e., the high-yield-point steel plate 21, the first low-yield-point steel plate 22, and the second low-yield-point steel plate 23).

The connection plate 51 is provided at the end segment of the core 2 so as to extend inside and outside the restrainer 3.

The connection plate 51 is connected to the high-yield-point steel plate 21, the first low-yield-point steel plate 22, and the second low-yield-point steel plate 23. Specifically, as shown in FIGS. 2A and 2D, the connection plate 51 includes a first connection segment W1 welded (i.e., connected) to the first elastic segment 21b of the high-yield-point steel plate 21. As shown in FIGS. 2A and 2C, the connection plate 51 further includes a second connection segment W2 welded (i.e., connected) to the second elastic segment 22b of the first low-yield-point steel plate 22, and a third connection segment W3 welded (i.e., connected) to the third elastic segment 23b of the second low-yield-point steel plate 23. Note that the connection of the connection plate 51 to the high-yield-point steel plate 21, the first low-yield-point steel plate 22, and the second low-yield-point steel plate 23 is not limited to welding, and may be, for example, a pinned connection or bolted connection.

The second connection segment W2 and the third connection segment W3 are located closer to the center in the axial direction than the first connection segment W1. The first connection segment W1 is provided so as not to overlap the second connection segment W2 in the axial direction. The first connection segment W1 is provided so as not to overlap the third connection segment W3 in the axial direction.

The first connection segment W1 is provided so as to extend inside and outside the restrainer 3. The second connection segment W2 and the third connection segment W3 are provided inside the restrainer 3. The position of the second connection segment W2 in the axial direction is the same as the position of the third connection segment W3 in the axial direction.

In order to facilitate the connection of the connection plate 51 to the first elastic segment 21b, notches for exposing the first connection segment W1 are formed in the second and third elastic segments 22b and 23b at positions corresponding to the first connection segment W1.

Figure 3:
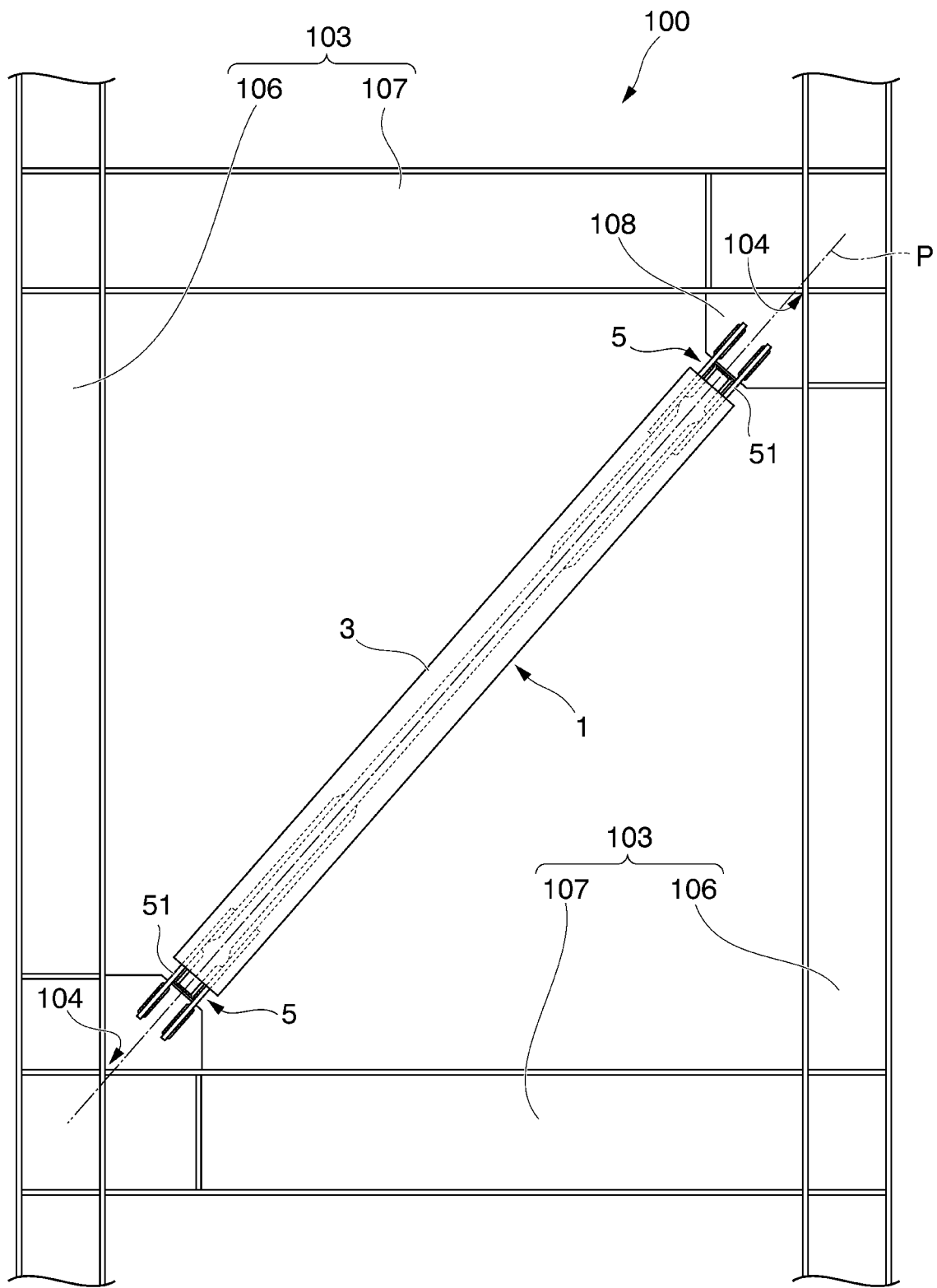
FIG. 3 is a diagram showing a seismic force-resisting structure in which the buckling-restrained brace according to the first embodiment of the present invention is installed.

Next, a seismic force-resisting structure 100 in which the buckling-restrained brace 1 is installed will be described with reference to FIG. 3.

The seismic force-resisting structure 100 includes a plurality of frames 103 each having a rectangular outer shape, gusset plates (i.e., mounting members) 108 arranged at corners 104 of the frame 103, and the buckling-restrained brace 1 attached to the frame 103 via the gusset plates 108.

The frame 103 includes two vertical frame members 106 (for example, steel columns) extending in the vertical direction and separated from each other in the horizontal direction, and two horizontal frame members 107 (for example, steel beams) for connecting the upper ends of the vertical frame members 106 to each other and the lower ends of the vertical frame members 106 to each other. The corner 104 is formed at a connection between the vertical frame member 106 and the horizontal frame member 107.

The gusset plates 108 are flat plate members, and are disposed at the corners 104 of the frame 103. Specifically, the gusset plate 108 is provided between the vertical frame member 106 and the horizontal frame member 107 and extends diagonally upward or diagonally downward so as to project inward from the frame 103.

The gusset plate 108 is connected to the vertical frame member 106 and the horizontal frame member 107 by, for example, welding.

The buckling-restrained brace 1 is disposed so as to connect the diagonally-located two gusset plates 108 of the frame 103 to each other. The buckling-restrained brace 1 spans between the gusset plates 108. That is, the buckling-restrained brace 1 is provided so that its axis is inclined with respect to the vertical direction and the horizontal direction.

The buckling-restrained brace 1 is connected to the gusset plate 108 by welding. Specifically, the pair of connection plates 51 are respectively inserted into a pair of slits (not shown) provided in the gusset plate 108. At this time, the core 2 is disposed parallel to the gusset plate 108. The end of the core 2 (i.e., the ends of the high-yield-point steel plate 21, the first low-yield-point steel plate 22, and the second low-yield-point steel plate 23) faces the end of the gusset plate 108 in the axial direction. In this state, the connection plates 51 are welded to the gusset plate 108.

Figure 10:
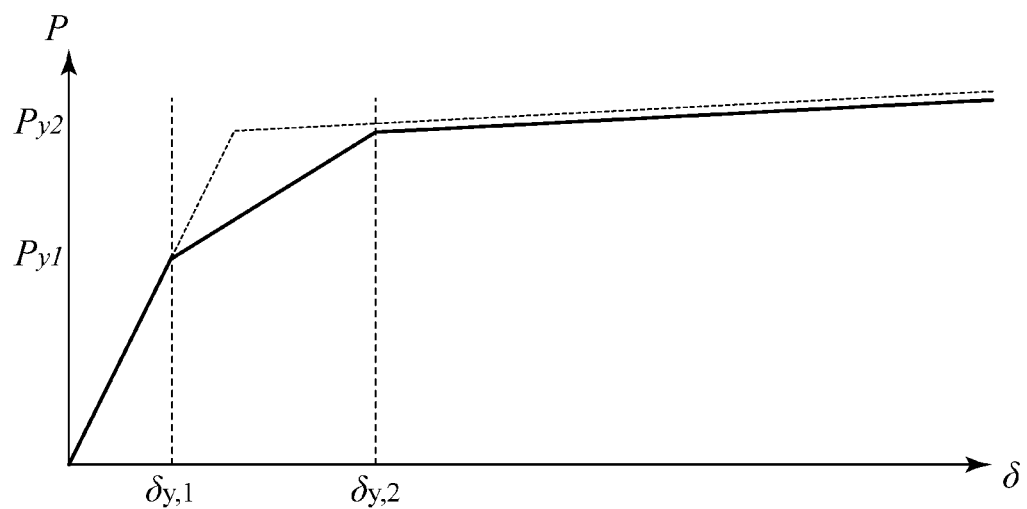
FIG. 10 is a graph showing a behavior of the buckling-restrained brace according to the first embodiment of the present invention.

The effect of the buckling-restrained brace 1 of the present embodiment will be described with reference to FIG. 10. FIG. 10 is a graph showing a behavior of the buckling-restrained brace 1. In FIG. 10, the vertical axis shows an axial load P applied to the core of the buckling-restrained brace, and the horizontal axis shows an axial displacement δ of the core of the buckling-restrained brace. In FIG. 10, as a comparative example, a behavior of a conventional buckling-restrained brace in which a core is composed of one steel plate is shown by a dotted line.

As shown by the dotted line in FIG. 10, the behavior of the conventional buckling-restrained brace is close to bilinear, and the tangent stiffness, which is the post-yield stiffness, of the core is low. That is, in the conventional buckling-restrained brace, when the core yields due to an earthquake or the like, the residual drift occurs in most of the yielding part of the core. Therefore, even in a medium-scale earthquake where the core of the buckling-restrained brace slightly yields, the residual drift remains in the seismic force-resisting structure in which the buckling-restrained brace is installed, and as a result, there is a possibility that continuous use of the seismic force-resisting structure may be impossible.

In the buckling-restrained brace 1 according to the present embodiment, the core 2 includes the high-yield-point steel plate 21 having a first yield point, the first low-yield-point steel plate 22 having a second yield point different from the first yield point, and the second low-yield-point steel plate 23 having a third yield point different from the first yield point, and the high-yield-point steel plate 21 is sandwiched between the first low-yield-point steel plate 22 and the second low-yield-point steel plate 23. The length L1 of the first yielding segment 21*a* of the high-yield-point steel plate 21 in the axial direction is different from the length L2 of the second yielding segment 22*a* of the first low-yield-point steel plate 22 in the axial direction, and is different from the length L3 of the third yielding segment 23*a* of the second low-yield-point steel plate 23 in the axial direction.

In the present embodiment, the core 2 includes two types of steel plates (the high-yield-point steel plate 21 and the low-yield-point steel plates 22 and 23) having different yield points. Accordingly, as shown by the solid line in FIG. 10, the behavior of the buckling-restrained brace 1 is trilinear. Specifically, when the axial load $P_{y1}$ is applied to the core 2, the low-yield-point steel plates 22, 23 yield prior to the high-yield-point steel plate 21. A first yield displacement $\delta_{y,1}$ when the axial load $P_{y1}$ is applied to the core 2 corresponds to the yield displacement of the low-yield-point steel plates 22, 23. Then, when the axial load applied to the core 2 becomes $P_{y2}$, the high-yield-point steel plate 21 yields. A second yield displacement $\delta_{y,2}$ when the axial load $P_{y2}$ is applied to the core 2 corresponds to the yield displacement of the high-yield-point steel plate 21. That is, in a drift region where the axial load applied to the core 2 is within a range of $P_{y1}$ to $P_{y2}$, the low-yield-point steel plates 22 and 23 yield, but the high-yield-point steel plate 21 remains elastic. In the drift region, since the high-yield-point steel plate 21 remains elastic, the tangent stiffness of the entire buckling-restrained brace 1 is high, and therefore the residual drift of the buckling-restrained brace 1 can be reduced.

Here, the drift region can be controlled by changing the difference between the first yield displacement $\delta_{y,1}$ when the axial load $P_{y1}$ is applied to the core 2 and the second yield displacement $\delta_{y,2}$ when the axial load $P_{y2}$ is applied to the core 2 (i.e., by changing the ratio $\alpha_\delta$ of steel plate yield deformations: $\alpha_\delta = \delta_{y,2}/\delta_{y,1}$). The ratio $\alpha_\delta$ of steel plate yield deformations is a ratio of the second yield displacement $\delta_{y,2}$ when the axial load $P_{y2}$, at which yielding of the high-yield-point steel plate 21 occurs, is applied to the core 2, to the first yield displacement $\delta_{y,1}$ when the axial load $P_{y1}$, at which yielding of the first low-yield-point steel plate 22 or the second low-yield-point steel plate 23 occurs, is applied to the core 2. By making the length L1 of the first yielding segment 21*a* in the axial direction be different from the length L2 of the second yielding segment 22*a* in the axial direction and be different from the length L3 of the third yielding segment 23*a* in the axial direction, it is possible to adjust to increase the ratio $\alpha_\delta$ of steel plate yield deformations. Specifically, the larger the ratio as of steel plate yield deformations, the larger the drift region. Further, the larger the length of the yielding segment of the steel plate in the axial direction, the larger the yield displacement of the steel plate. In the present embodiment, by increasing the length L1 of the first yielding segment 21*a* of the high-yield-point steel plate 21 in the axial direction, the second yield displacement $\delta_{y,2}$ is increased, compared with a case where the length of the yielding segment of the high-yield-point steel plate in the axial direction is the same as the length of the low-yield-point steel plate in the axial direction. As a result, the ratio do of steel plate yield deformations is increased, and thus the deformation region is also increased, so that the effect of reducing the residual drift of the buckling-restrained brace 1 when receiving a plastic axial deformation due to an earthquake or the like can be enhanced.

Further, the high-yield-point steel plate 21 is sandwiched between the first and second low-yield-point steel plates 22 and 23 in the thickness direction. Thereby, the high-yield-point steel plate 21 is supported from both sides in the thickness direction by the first and second low-yield-point steel plates 22 and 23. Therefore, even when the length L1 of the first yielding segment 21*a* in the axial direction is increased, it is possible to suppress buckling of the first yielding segment 21*a* and to secure the strength of the buckling-restrained brace 1.

Therefore, according to the buckling-restrained brace 1 of the present embodiment, it is possible to reduce the residual drift of the buckling-restrained brace 1 when receiving a plastic axial deformation due to an earthquake or the like while securing the strength of the buckling-restrained brace 1 itself.

The buckling-restrained brace 1 includes the connectors 5 which are connected to both end segments of the core 2. Each connector 5 includes the first connection segment W1 connected to the high-yield-point steel plate 21, the second connection segment W2 connected to the first low-yield-point steel plate 22, and the third connection segment W3 connected to the second low-yield-point steel plate 23.

Thereby, it is possible to easily install the buckling-restrained brace 1 in the seismic force-resisting structure 100 by using the connectors 5.

The second connection segment W2 and the third connection segment W3 are located closer to the center in the axial direction than the first connection segment W1.

The connector 5 is connected to the elastic segments 21*b* to 23*b* of the high-yield-point steel plate 21, the first low-yield-point steel plate 22, and the second low-yield-point steel plate 23. Since the length L1 of the first yielding segment 21*a* in the axial direction is longer than the length L2 of the second yielding segment 22*a* in the axial direction and is longer than the length L3 of the third yielding segment 23*a* in the axial direction, the second elastic segment 22*b* and the third elastic segment 23*b* are disposed closer to the center in the axial direction than the first elastic segment 21*b*. By locating the second connection segment W2 and the third connection segment W3 closer to the center in the axial direction than the first connection segment W1, it is possible to efficiently connect the connector 5 to the high-yield-point steel plate 21, the first low-yield-point steel plate 22, and the second low-yield-point steel plate 23.

The first connection segment W1 is provided so as not to overlap the second connection segment W2 in the axial direction, and is provided so as not to overlap the third connection segment W3 in the axial direction.

Thereby, it is possible to easily connect the connector 5 to the high-yield-point steel plate 21, the first low-yield-point steel plate 22, and the second low-yield-point steel plate 23.

Each connector 5 includes the pair of connection plates 51, and the high-yield-point steel plate 21, the first low-yield-point steel plate 22, and the second low-yield-point steel plate 23 are sandwiched between the pair of connection plates 51 in a direction intersecting the thickness direction of the high-yield-point steel plate 21.

Thereby, the high-yield-point steel plate 21, the first low-yield-point steel plate 22, and the second low-yield-point steel plate 23 are supported, from both sides in the direction intersecting the thickness direction, by the pair of connection plates 51. Therefore, it is possible to further enhance the strength of the buckling-restrained brace 1.

The second yield point is the same as the third yield point, and the length of the second yielding segment 22a in the axial direction is the same as the length of the third yielding segment 23a in the axial direction.

The first low-yield-point steel plate 22 and the second low-yield-point steel plate 23 are symmetric in the thickness direction, with respect to the thickness-center of the high-yield-point steel plate 21 in the thickness direction.

Thereby, since the core 2 is formed to be symmetric in the thickness direction, it is possible to stably yield the core 2 while suppressing buckling. Therefore, it is possible to improve the performance of the buckling-restrained brace 1.

The high-yield-point steel plate 21, the first low-yield-point steel plate 22, and the second low-yield-point steel plate 23 are arranged parallel to each other.

Thereby, the high-yield-point steel plate 21 is entirely supported by the first and second low-yield-point steel plates 22 and 23, and therefore it is possible to more effectively suppress buckling of the first yielding segment 21a and to further enhance the strength of the buckling-restrained brace 1.

The spacer 6 is provided between the first low-yield-point steel plate 22 and the second low-yield-point steel plate 23.

As the high-yield-point steel plate 21 disposed between the first low-yield-point steel plate 22 and the second low-yield-point steel plate 23 is supported by the spacer 6, it is possible to suppress the deformation (for example, in-plane buckling) of the high-yield-point steel plate 21 in a direction other than the axial direction. In particular, when the infill material 4 is filled between the core 2 and the restrainer 3, there is a possibility that the gap between the first low-yield-point steel plate 22 and the second low-yield-point steel plate 23 may be insufficiently filled with the infill material 4. By providing the spacer 6, the gap between the first low-yield-point steel plate 22 and the second low-yield-point steel plate 23 can be filled with the spacer 6, and accordingly, it is possible to reliably suppress the deformation of the high-yield-point steel plate 21 in a direction other than the axial direction.

Second Embodiment

Next, a buckling-restrained brace 1A according to a second embodiment of the present invention will be described with reference to FIGS. 4A to 4D. In the present embodiment, the same components as those in the first embodiment are denoted by the same reference numerals, the description thereof will be omitted, and only the different parts will be described.

Figure 4B:
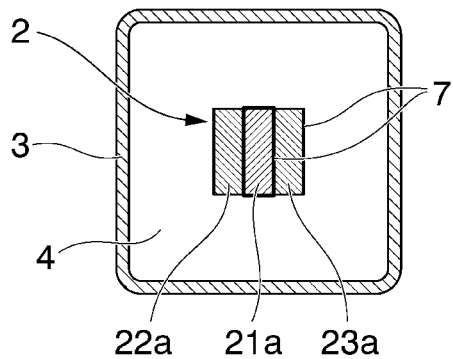
FIG. 4B is a sectional view taken along the line A-A in FIG. 4A.
Figure 4C:
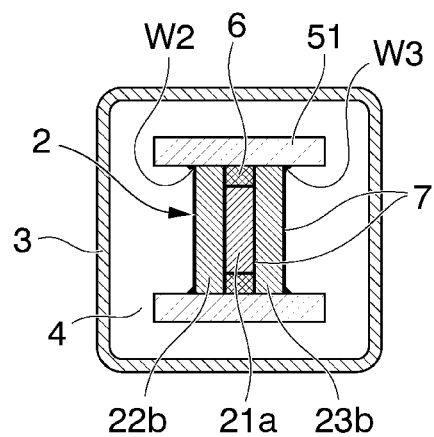
FIG. 4C is a sectional view taken along the line B-B in FIG. 4A.
Figure 4D:
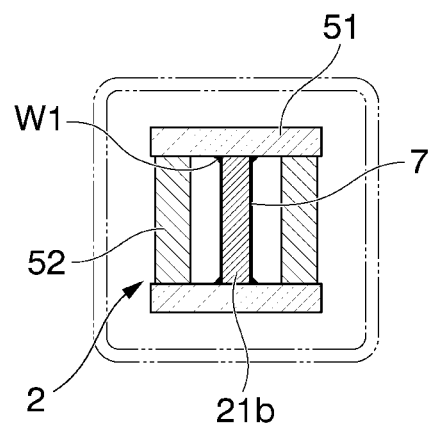
FIG. 4D is a sectional view taken along the line C-C in FIG. 4A.

FIG. 4A is a front view of an end segment on one side of the buckling-restrained brace 1A, FIG. 4B is a sectional view taken along the line A-A in FIG. 4A, FIG. 4C is a sectional view taken along the line B-B in FIG. 4A, and FIG. 4D is a sectional view taken along the line C-C in FIG. 4A.

The present embodiment differs from the first embodiment in that the buckling-restrained brace 1A is connected to the gusset plate 108 using a pinned connection.

In the present embodiment, the length of the first low-yield-point steel plate 22 in the axial direction is shorter than the length of the high-yield-point steel plate 21 in the axial direction, and the length of the second low-yield-point steel plate 23 in the axial direction is shorter than the length of the high-yield-point steel plate 21 in the axial direction. Accordingly, the end segments of the high-yield-point steel plate 21 protrude from the first low-yield-point steel plate 22 and the second low-yield-point steel plate 23.

Each connector 5 includes a pair of clevis plates 52, in addition to the pair of connection plates 51. Each clevis plate 52 is provided at a protruding segment of the high-yield-point steel plate 21 that protrudes from the first low-yield-point steel plate 22 and the second low-yield-point steel plate 23.

The core 2 (i.e., the high-yield-point steel plate 21) is sandwiched between the pair of clevis plates 52 in the thickness direction. The clevis plates 52 are arranged parallel to the high-yield-point steel plate 21. The clevis plate 52 is provided perpendicular to the connection plate 51.

The clevis plate 52 is provided so as to extend inside and outside the restrainer 3. The clevis plate 52 is provided so as to protrude further outside in the axial direction than the high-yield-point steel plate 21. A gap is formed between protruding segments of the pair of clevis plates 52 protruding from the high-yield-point steel plate 21, and the gusset plate 108 is inserted into the gap. A through-hole 52a is formed in the protruding segment of the clevis plate 52, and a support pin 9 is inserted through the through-hole 52a.

The core 2 and the pair of clevis plates 52 are sandwiched between the pair of connection plates 51 in the width direction. As shown in FIG. 4D, the pair of connection plates 51 and the pair of clevis plates 52 are disposed so as to form a rectangular shape when seen in the axial direction. The clevis plates 52 are welded (i.e., connected) to the connection plates 51.

The clevis plate 52 is provided so as not to overlap the first low-yield-point steel plate 22 and the second low-yield-point steel plate 23 in the axial direction. Thereby, it is possible to easily weld the clevis plate 52 to the connection plate 51. The clevis plate 52 may overlap the first low-yield-point steel plate 22 and the second low-yield-point steel plate 23 in the axial direction.

Similar to the first embodiment, the first connection segment W1 of the connection plate 51 is welded to the first elastic segment 21b of the high-yield-point steel plate 21, the second connection segment W2 of the connection plate 51 is welded to the second elastic segment 22b of the first low-yield-point steel plate 22, and the third connection segment W3 of the connection plate 51 is welded to the third elastic segment 23b of the second low-yield-point steel plate 23.

The buckling-restrained brace 1A is connected to the gusset plate 108 using a pinned connection. Specifically, the gusset plate 108 is inserted between the protruding segments of the pair of clevis plates 52. At this time, the core 2 is disposed parallel to the gusset plate 108. The end of the core 2 (i.e., the end of the high-yield-point steel plate 21) faces the end of the gusset plate 108 in the axial direction. The clevis plate 52 is disposed so as to span between the high-yield-point steel plate 21 and the gusset plate 108. In this state, the support pin 9 is inserted through the through-holes 52*a* formed in the pair of clevis plates 52 and a through-hole (not shown) formed in the gusset plate 108. Thereby, the buckling-restrained brace 1A is rotatably pinned to the gusset plate 108.

In the present embodiment, it is possible to obtain the same effect as that of the first embodiment. That is, according to the buckling-restrained brace 1A of the present embodiment, it is possible to reduce the residual drift of the buckling-restrained brace 1A when receiving a plastic axial deformation due to an earthquake or the like while securing the strength of the buckling-restrained brace 1A itself.

Further, the buckling-restrained brace 1A of the present embodiment can be connected to the gusset plate 108 using a pinned connection.

Third Embodiment

Next, a buckling-restrained brace 1B according to a third embodiment of the present invention will be described with reference to FIGS. 5A to 5D. In the present embodiment, the same components as those in the first embodiment are denoted by the same reference numerals, the description thereof will be omitted, and only the different parts will be described.

Figure 5B:
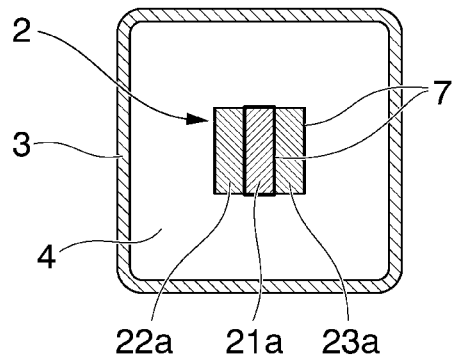
FIG. 5B is a sectional view taken along the line A-A in FIG. 5A.
Figure 5C:
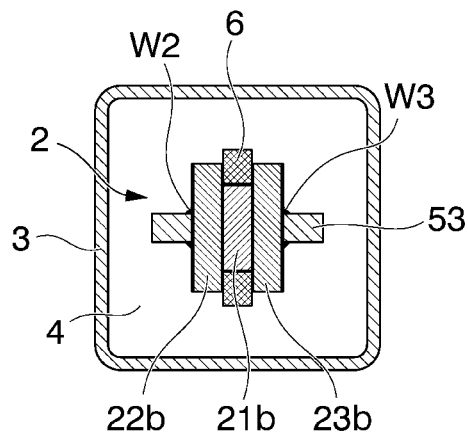
FIG. 5C is a sectional view taken along the line B-B in FIG. 5A.
Figure 5D:
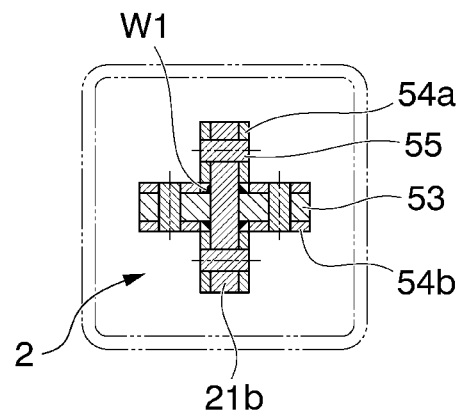
FIG. 5D is a sectional view taken along the line C-C in FIG. 5A.

FIG. 5A is a front view of an end segment on one side of the buckling-restrained brace 1B, FIG. 5B is a sectional view taken along the line A-A in FIG. 5A, FIG. 5C is a sectional view taken along the line B-B in FIG. 5A, and FIG. 5D is a sectional view taken along the line C-C in FIG. 5A.

The present embodiment differs from the first embodiment in that the buckling-restrained brace 1B is connected to the gusset plate 108 using a bolted connection.

In the present embodiment, the length of the first low-yield-point steel plate 22 in the axial direction is shorter than the length of the high-yield-point steel plate 21 in the axial direction, and the length of the second low-yield-point steel plate 23 in the axial direction is shorter than the length of the high-yield-point steel plate 21 in the axial direction. Accordingly, the end segments of the high-yield-point steel plate 21 protrude from the first low-yield-point steel plate 22 and the second low-yield-point steel plate 23. The high-yield-point steel plate 21 is provided such that the first yielding segment 21*a* protrudes from the restrainer 3. That is, the length L1 of the first yielding segment 21*a* in the axial direction is longer than the length of the restrainer 3 in the axial direction. The first elastic segment 21*b* is located outside the restrainer 3.

A plurality of through-holes are formed in the first elastic segment 21*b*, and bolts 55 are inserted through the plurality of through-holes.

Each connector 5 includes, instead of the pair of connection plates 51, a pair of connection plates 53, a plurality (four in the present embodiment) of first splice plates (joint plates) 54*a*, and a plurality (four in the present embodiment) of second splice plates (joint plates) 54*b*.

The core 2 is sandwiched between the pair of connection plates 53 in the thickness direction. Each connection plate 53 is provided in the center of the core 2 in the width direction. The connection plate 53 is provided perpendicular to the core 2 (i.e., the high-yield-point steel plate 21, the first low-yield-point steel plate 22, and the second low-yield-point steel plate 23).

The connection plate 53 is provided so as to extend inside and outside the restrainer 3. The connection plate 53 extends, from the inside of the restrainer 3, to a position corresponding to the end of the high-yield-point steel plate 21 in the axial direction.

A plurality of through-holes are formed in the connection plate 53, and the bolts 55 are inserted through the plurality of through-holes.

The connection plate 53 includes a first connection segment W1 welded to the first elastic segment 21*b* of the high-yield-point steel plate 21, a second connection segment W2 welded to the second elastic segment 22*b* of the first low-yield-point steel plate 22, and a third connection segment W3 welded to the third elastic segment 23*b* of the second low-yield-point steel plate 23.

Since the first elastic segment 21*b* is located outside the restrainer 3, the first connection segment W1 is provided outside the restrainer 3. The second connection segment W2 and the third connection segment W3 are provided so as to extend inside and outside of the restrainer 3.

As shown in FIG. 5D, the high-yield-point steel plate 21 is sandwiched between a pair of the first splice plates 54*a* in the thickness direction. The pair of first splice plates 54*a* are provided at each of both edges of the high-yield-point steel plate 21 in the width direction. That is, in one end segment of the buckling-restrained brace 1B, two sets of the pair of first splice plates 54*a* (total of four first splice plates 54*a*) are provided.

Each first splice plate 54*a* is provided at a protruding segment of the high-yield-point steel plate 21 protruding from the first low-yield-point steel plate 22 and the second low-yield-point steel plate 23. The first splice plate 54*a* is provided so as to protrude further outside in the axial direction than the high-yield-point steel plate 21. A gap is formed between protruding segments of the pair of splice plates 54*a* protruding from the high-yield-point steel plate 21, and the gusset plate 108 is inserted into the gap.

A plurality of through-holes are formed in the first splice plate 54*a*, and the bolts 55 are inserted through the plurality of through-holes.

The connection plate 53 is sandwiched between a pair of the second splice plates 54*b* in the thickness direction of the connection plate 53 (i.e., the width direction of the high-yield-point steel plate 21). The pair of second splice plates 54*b* are provided at each of the pair of the connection plates 53. That is, in one end segment of the buckling-restrained brace 1B, two sets of the pair of second splice plates 54*b* (total of four second splice plates 54*b*) are provided. The first splice plate 54*a* and the second splice plate 54*b* are disposed perpendicular to each other.

The second splice plate 54*b* is provided so as to overlap at least the protruding segment of the high-yield-point steel plate 21 protruding from the first low-yield-point steel plate 22 and the second low-yield-point steel plate 23 in the axial direction. The second splice plate 54*b* is provided so as to protrude further outside in the axial direction than the connection plate 53. A gap is formed between protruding segments of the pair of second splice plates 54*b* protruding from the connection plate 53, and a connection plate 109 (to be described later) attached to the gusset plate 108 is inserted into the gap.

A plurality of through-holes are formed in the second splice plate 54*b*, and the bolts 55 are inserted through the plurality of through-holes.

A pair of the connection plates 109 are connected to the gusset plate 108. The connection plate 109 is provided perpendicular to the gusset plate 108. The pair of connection plates 109 are disposed at positions where the pair of connection plates 109 face the pair of connection plates 53 in the axial direction when the buckling-restrained brace 1B is attached to the gusset plate 108.

A plurality of through-holes are formed in the connection plate 109, and the bolts 55 are inserted through the plurality of through-holes.

The buckling-restrained brace 1B is connected to the gusset plate 108 using a bolted connection. Specifically, the gusset plate 108 is inserted between the protruding segments of the pair of first splice plates 54a, and the connection plate 109 is inserted between the protruding segments of the pair of second splice plates 54b. At this time, the core 2 is disposed parallel to the gusset plate 108. The end of the core 2 (i.e., the end of the high-yield-point steel plate 21) faces the end of the gusset plate 108 in the axial direction. The end of the connection plate 53 faces the end of the connection plate 109 in the axial direction. The first splice plate 54a is disposed so as to span between the first elastic segment 21b and the gusset plate 108. The second splice plate 54b is disposed so as to span between the connection plate 53 and the connection plate 109.

The first elastic segment 21b and the pair of first splice plates 54a are fixed to each other with the bolts 55 and nuts (not shown). The gusset plate 108 and the pair of first splice plates 54a are fixed to each other with the bolts 55 and nuts (not shown). The connection plate 53 and the pair of second splice plates 54b are fixed to each other with the bolts 55 and nuts (not shown). The connection plate 109 and the pair of second splice plates 54b are fixed to each other with the bolts 55 and nuts (not shown). By tightly fastening the bolts 55 and the nuts, the buckling-restrained brace 1B is bolted to the gusset plate 108.

In the present embodiment, it is possible to obtain the same effect as that of the first embodiment. That is, according to the buckling-restrained brace 1B of the present embodiment, it is possible to reduce the residual drift of the buckling-restrained brace 1B when receiving a plastic axial deformation due to an earthquake or the like while securing the strength of the buckling-restrained brace 1B itself.

Further, the buckling-restrained brace 1B of the present embodiment can be connected to the gusset plate 108 using a bolted connection.

Further, in the present embodiment, the first yielding segment 21a protrudes from the restrainer 3.

Accordingly, the length L1 of the first yielding segment 21a in the axial direction can be further increased, so that the effect of reducing the residual drift of the buckling-restrained brace 1B can be further enhanced.

Fourth Embodiment

Next, a buckling-restrained brace 1C according to a fourth embodiment of the present invention will be described with reference to FIGS. 6A, 6B and 7A to 7E. In the present embodiment, the same components as those in the first embodiment are denoted by the same reference numerals, the description thereof will be omitted, and only the different parts will be described.

Figure 6A:
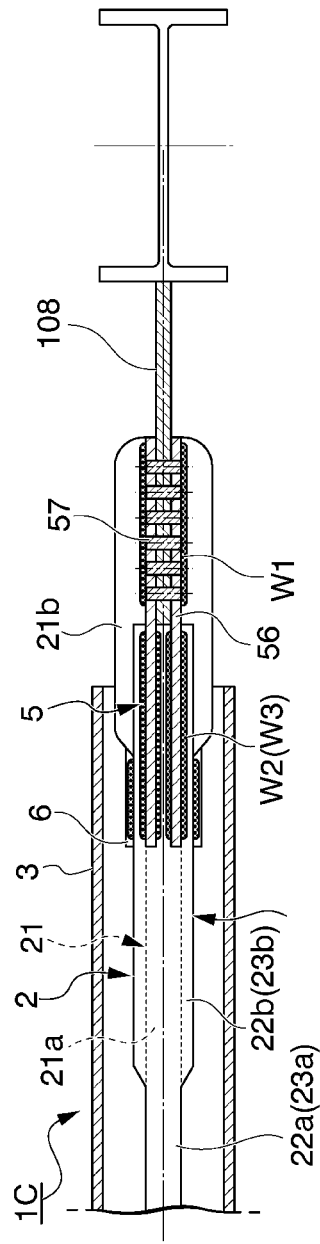
FIG. 6A is a front view of an end segment on one side of a buckling-restrained brace according to a fourth embodiment of the present invention.
Figure 6B:
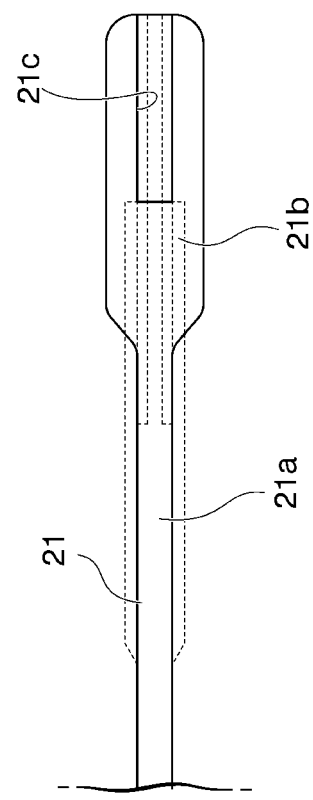
FIG. 6B is a front view of an end segment on one side of a high-yield-point steel plate of the buckling-restrained brace according to the fourth embodiment of the present invention.
Figure 7A:
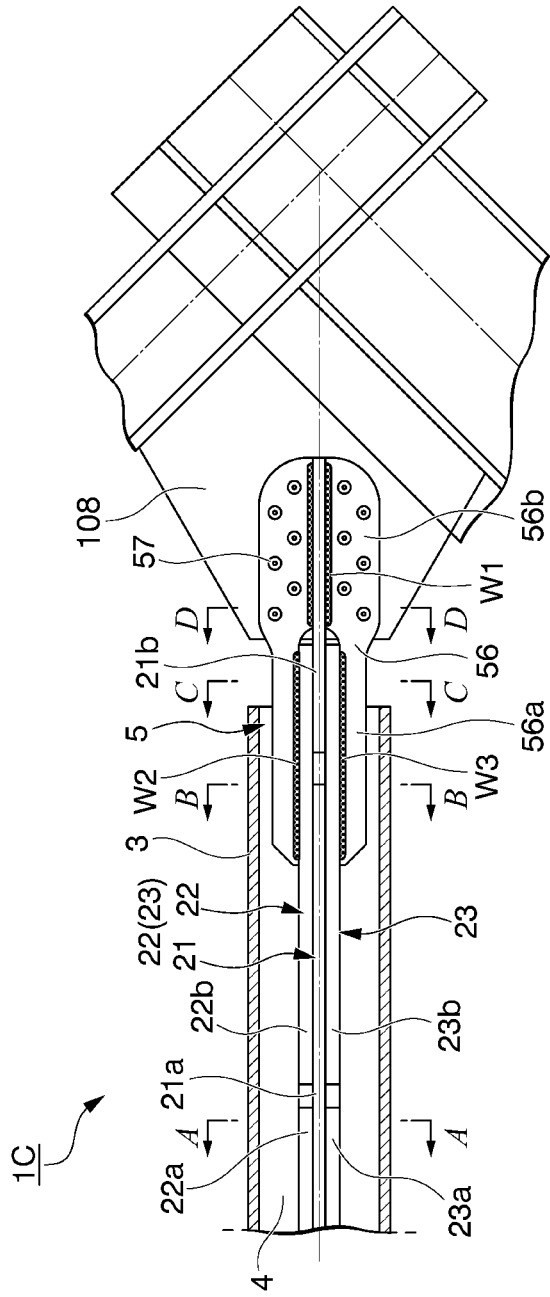
FIG. 7A is a plan view of the end segment on one side of the buckling-restrained brace according to the fourth embodiment of the present invention.
Figure 7B:
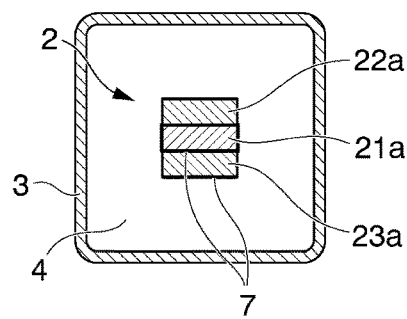
FIG. 7B is a sectional view taken along the line A-A in FIG. 7A.
Figure 7C:
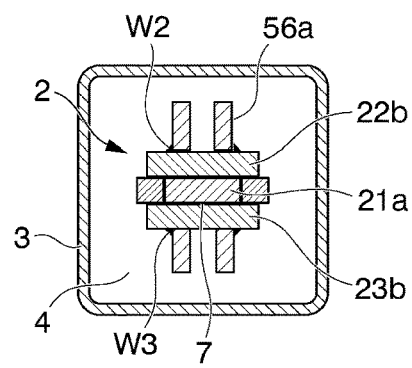
FIG. 7C is a sectional view taken along the line B-B in FIG. 7A.
Figure 7D:
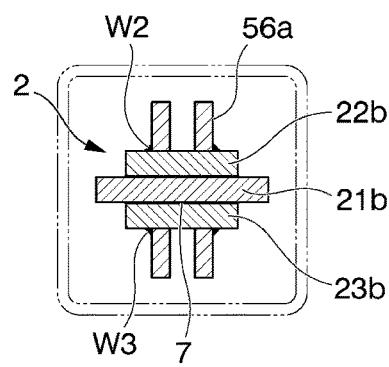
FIG. 7D is a sectional view taken along the line C-C in FIG. 7A.
Figure 7E:
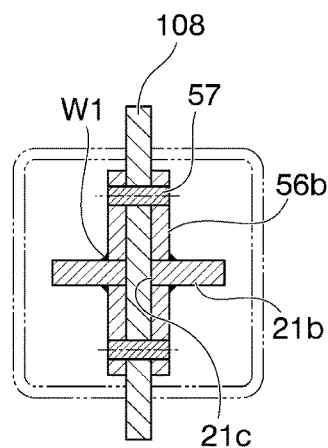
FIG. 7E is a sectional view taken along the line D-D in FIG. 7A.

FIG. 6A is a front view of an end segment on one side of the buckling-restrained brace 1C, and FIG. 6B is a front view of an end segment on one side of the high-yield-point steel plate 21 of the buckling-restrained brace 1C. FIG. 7A is a plan view of the end segment on one side of the buckling-restrained brace 1C, FIG. 7B is a sectional view taken along the line A-A in FIG. 7A, FIG. 7C is a sectional view taken along the line B-B in FIG. 7A, FIG. 7D is a sectional view taken along the line C-C in FIG. 7A, and FIG. 7E is a sectional view taken along the line D-D in FIG. 7A.

The present embodiment differs from the first embodiment in that the buckling-restrained brace 1C is connected to the gusset plate 108 using a bolted connection. That is, the present embodiment is another example different from the third embodiment in which the buckling-restrained brace is bolted to the gusset plate 108.

In the present embodiment, the length of the first low-yield-point steel plate 22 in the axial direction is shorter than the length of the high-yield-point steel plate 21 in the axial direction, and the length of the second low-yield-point steel plate 23 in the axial direction is shorter than the length of the high-yield-point steel plate 21 in the axial direction. Accordingly, the end segments of the high-yield-point steel plate 21 (i.e., the first elastic segments 21b) protrude from the first low-yield-point steel plate 22 and the second low-yield-point steel plate 23.

Further, as shown in FIG. 6B, a slit 21c is formed in the first elastic segment 21b of the high-yield-point steel plate 21. The slit 21c is formed in a protruding segment of the high-yield-point steel plate 21 protruding from the first low-yield-point steel plate 22 and the second low-yield-point steel plate 23. The slit 21c extends from the end of the high-yield-point steel plate 21 in the axial direction to a position corresponding to the end of the first low-yield-point steel plate 22 or the second low-yield-point steel plate 23 in the axial direction. The slit 21c is provided in the center of the first elastic segment 21b in the width direction. The gusset plate 108 is inserted into the slit 21c when the buckling-restrained brace 1C is attached to the gusset plate 108.

Each connector 5 includes, instead of the pair of connection plates 51, a plurality (four in the present embodiment) of lug plates (joint plates) 56.

As shown in FIG. 7A, the core 2 is sandwiched between a pair of the lug plates 56 in the thickness direction. The lug plate 56 is provided perpendicular to the core 2 (i.e., the high-yield-point steel plate 21, the first low-yield-point steel plate 22, and the second low-yield-point steel plate 23). The lug plate 56 is provided so as to extend inside and outside the restrainer 3.

As shown in FIG. 6A and FIGS. 7C to 7E, two sets of the pair of lug plates 56 are provided at intervals in the width direction. The two sets are symmetrically provided with respect to the center of the core 2 in the width direction. That is, in one end segment of the buckling-restrained brace 1C, two sets of the pair of lug plates 56 (total of four lug plates 56) are provided. The gusset plate 108 is inserted between the lug plates 56 provided at intervals in the width direction.

A plurality of through-holes are formed in the lug plate 56, and bolts 57 are inserted through the plurality of through-holes.

The lug plate 56 includes an inner segment 56a connected to the first low-yield-point steel plate 22 or the second low-yield-point steel plate 23, and an outer segment 56b connected to the high-yield-point steel plate 21. The outer segment 56b corresponds to a first connection segment W1 which is welded (connected) to the first elastic segment 21b. The inner segment 56a corresponds to a second connection segment W2 or a third connection segment W3 which is welded (connected) to the second elastic segment 22b or the third elastic segment 23b.

The outer segment 56b is provided further outside in the axial direction than the first low-yield-point steel plate 22 and the second low-yield-point steel plate 23. The width of the inner segment 56a is smaller than the outer segment 56b by the width of the first low-yield-point steel plate 22 or the second low-yield-point steel plate 23. That is, the outer segment 56b protrudes toward the high-yield-point steel plate 21 from the inner portion 56a by the width of the first low-yield-point steel plate 22 or the second low-yield-point steel plate 23. The gusset plate 108 is inserted between the outer segments 56b of the lug plates 56.

The buckling-restrained brace 1C is connected to the gusset plate 108 using a bolted connection. Specifically, the gusset plate 108 is inserted into the slit 21c formed in the high-yield-point steel plate 21. At this time, the gusset plate 108 is also inserted between the outer segments 56b of the lug plates 56 provided at intervals in the width direction. The core 2 is disposed perpendicular to the gusset plate 108. The ends of the first low-yield-point steel plate 22 and the second low-yield-point steel plate 23 face the end of the gusset plate 108 in the axial direction. The lug plate 56 is disposed so as to span between the gusset plate 108 and the first low-yield-point steel plate 22 or the second low-yield-point steel plate 23.

The gusset plate 108 and the pair of lug plates 56 are fixed to each other with the bolts 57 and nuts (not shown). By tightly fastening the bolts 57 and the nuts, the buckling-restrained brace 1C is bolted to the gusset plate 108.

In the present embodiment, it is possible to obtain the same effect as that of the first embodiment. That is, according to the buckling-restrained brace 1C of the present embodiment, it is possible to reduce the residual drift of the buckling-restrained brace 1C when receiving a plastic axial deformation due to an earthquake or the like while securing the strength of the buckling-restrained brace 1C itself.

Further, the buckling-restrained brace 1C of the present embodiment can be connected to the gusset plate 108 using a bolted connection.

Fifth Embodiment

Next, a buckling-restrained brace 1D according to a fifth embodiment of the present invention will be described with reference to FIGS. 8A to 8D. In the present embodiment, the same components as those in the first embodiment are denoted by the same reference numerals, the description thereof will be omitted, and only the different parts will be described.

Figure 8A:
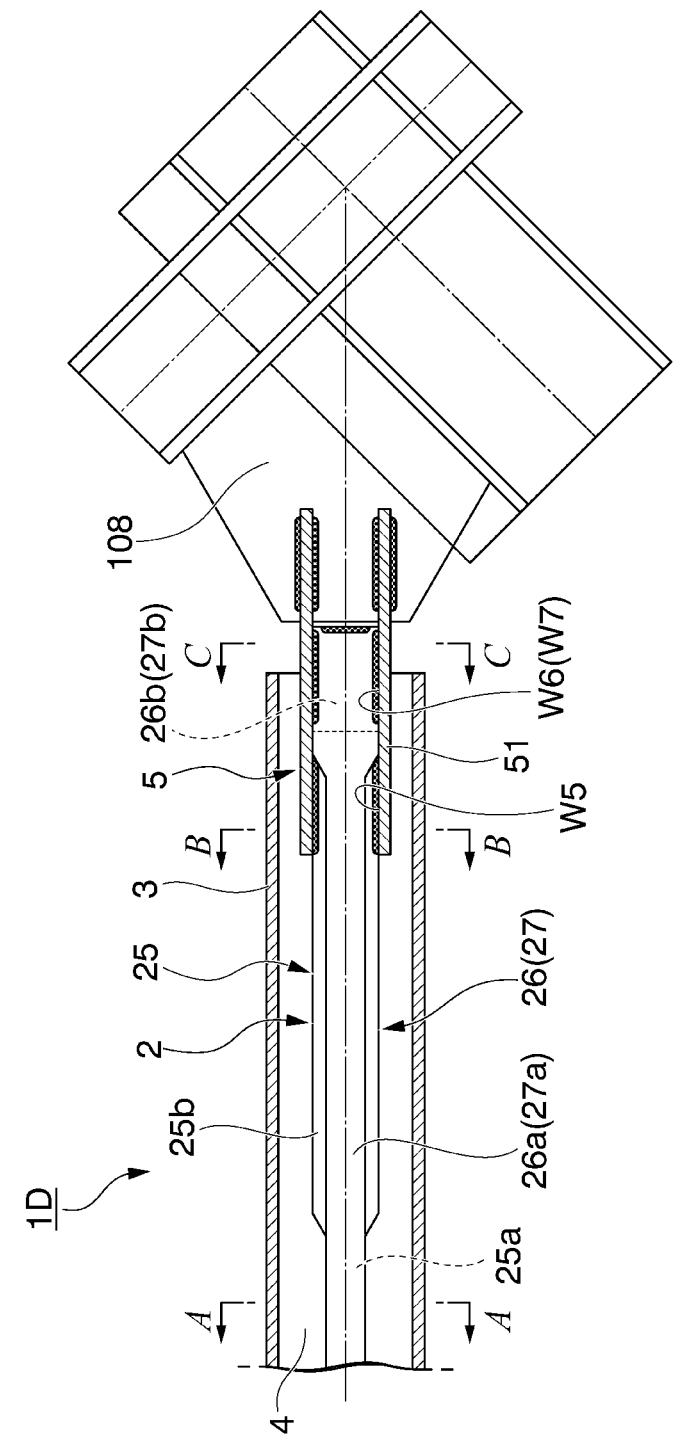
FIG. 8A is a front view of an end segment on one side of a buckling-restrained brace according to a fifth embodiment of the present invention.
Figure 8B:
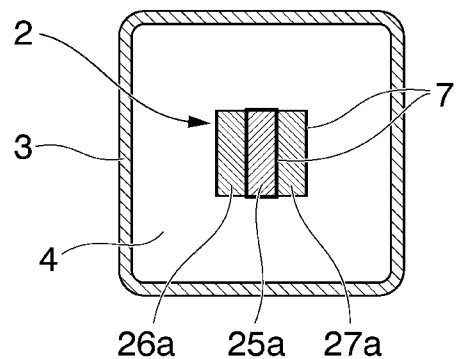
FIG. 8B is a sectional view taken along the line A-A in FIG. 8A.
Figure 8C:
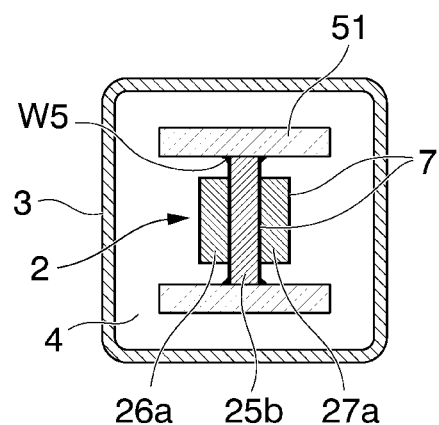
FIG. 8C is a sectional view taken along the line B-B in FIG. 8A.
Figure 8D:
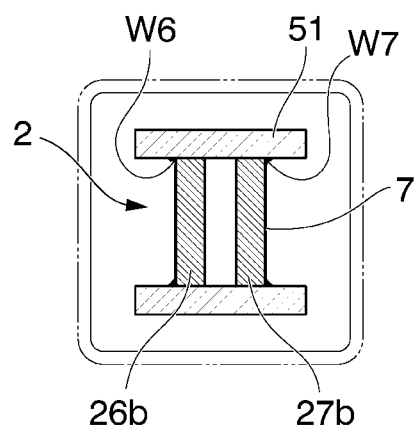
FIG. 8D is a sectional view taken along the line C-C in FIG. 8A.

FIG. 8A is a front view of an end segment on one side of the buckling-restrained brace 1D, FIG. 8B is a sectional view taken along the line A-A in FIG. 8A, FIG. 8C is a sectional view taken along the line B-B in FIG. 8A, and FIG. 8D is a sectional view taken along the line C-C in FIG. 8A.

In the buckling-restrained brace 1D of the present embodiment, the core 2 includes a low-yield-point steel plate (i.e., a first steel plate) 25, a first high-yield-point steel plate (i.e., a second steel plate) 26, and a second high-yield-point steel plate (i.e., a third steel plate) 27.

That is, the present embodiment differs from the first embodiment in that the first steel plate is a low-yield-point steel plate and the second and third steel plates are high-yield-point steel plates.

The low-yield-point steel plate 25, the first high-yield-point steel plate 26, and the second high-yield-point steel plate 27 are elongated flat plates.

The low-yield-point steel plate 25, the first high-yield-point steel plate 26, and the second high-yield-point steel plate 27 extend straight in the axial direction. The low-yield-point steel plate 25, the first high-yield-point steel plate 26, and the second high-yield-point steel plate 27 are arranged parallel to each other.

In the present embodiment, the length of the first high-yield-point steel plate 26 in the axial direction is longer than the length of the low-yield-point steel plate 25 in the axial direction, and the length of the second high-yield-point steel plate 27 in the axial direction is longer than the length of the low-yield-point steel plate 25 in the axial direction. Accordingly, the end segments of the first high-yield-point steel plate 26 and the end segments of the second high-yield-point steel plate 27 protrude from the low-yield-point steel plate 25.

The first high-yield-point steel plate 26, the low-yield-point steel plate 25, and the second high-yield-point steel plate 27 are arranged to be adjacent to each other in the thickness direction. The low-yield-point steel plate 25 is sandwiched between the first high-yield-point steel plate 26 and the second high-yield-point steel plate 27 in the thickness direction. The first high-yield-point steel plate 26 and the second high-yield-point steel plate 27 are symmetric in the thickness direction, with respect to the thickness-center of the low-yield-point steel plate 25 in the thickness direction. The low-yield-point steel plate 25, the first high-yield-point steel plate 26, and the second high-yield-point steel plate 27 are stacked in the thickness direction. In the present embodiment, the low-yield-point steel plate 25, the first high-yield-point steel plate 26, and the second high-yield-point steel plate 27 have the same thickness.

The low-yield-point steel plate 25 has a first yield point. The first high-yield-point steel plate 26 has a second yield point higher than the first yield point. The second high-yield-point steel plate 27 has a third yield point higher than the first yield point. The second yield point is the same as the third yield point.

The low-yield-point steel plate 25 includes a first yielding segment 25a provided in a center segment of the low-yield-point steel plate 25 in the axial direction. The width of the first yielding segment 25a is smaller than the width of both end segments of the low-yield-point steel plate 25 in the axial direction. Segments (i.e., both end segments) other than the first yielding segment 25a of the low-yield-point steel plate 25 are first elastic segments 25b whose width is larger than the width of the first yielding segment 25a. The axial strength of the first yielding segment 25a is smaller than the axial strength of the first elastic segments 25b.

The first high-yield-point steel plate 26 includes a second yielding segment 26a provided in a center segment of the first high-yield-point steel plate 26 in the axial direction. The width of the second yielding segment 26a is smaller than the width of both end segments of the first high-yield-point steel plate 26 in the axial direction. Segments (i.e., both end segments) other than the second yielding segment 26a of the first high-yield-point steel plate 26 are second elastic segments 26b whose width is larger than the width of the second yielding segment 26a. The axial strength of the second yielding segment 26a is smaller than the axial strength of the second elastic segments 26b.

The second high-yield-point steel plate 27 includes a third yielding segment 27a provided in a center segment of the second high-yield-point steel plate 27 in the axial direction. The width of the third yielding segment 27a is smaller than the width of both end segments of the second high-yield-point steel plate 27 in the axial direction. Segments (i.e., both end segments) other than the third yielding segment 27a of the second high-yield-point steel plate 27 are third elastic segments 27b whose width is larger than the width of the third yielding segment 27a. The axial strength of the third yielding segment 27a is smaller than the axial strength of the third elastic segments 27b.

The length of the first yielding segment 25a in the axial direction is shorter than the length of the second yielding segment 26a in the axial direction. The length of the first yielding segment 25a in the axial direction is shorter than the length of the third yielding segment 27a in the axial direction. The length of the second yielding segment 26a in the axial direction is the same as the length of the third yielding segment 27a in the axial direction.

The debonding layers 7 are provided between the low-yield-point steel plate 25 and the first high-yield-point steel plate 26, and between the low-yield-point steel plate and the second high-yield-point steel plate 27. The debonding layer 7 prevents the adjacent steel plates 25, 26, and 27 from being bonded and joined to each other. The debonding layer 7 prevents the transmission of the axial force of the low-yield-point steel plate 25 to the first high-yield-point steel plate 26 and the second high-yield-point steel plate 27, and prevents the transmission of the axial force of the first high-yield-point steel plate 26 and the second high-yield-point steel plate 27 to the low-yield-point steel plate 25, which permits the individual steel plates 25, 26, and 27 to have different yield lengths.

Note that the debonding layers 7 provided between the low-yield-point steel plate 25 and the first high-yield-point steel plate 26, and between the low-yield-point steel plate 25 and the second high-yield-point steel plate 27 may be omitted. The material and thickness of the debonding layers 7 between the low-yield-point steel plate 25, the first high-yield-point steel plate 26 and the second high-yield-point steel plate 27 may be different than the debonding layer 7 between the infill material 4 and the low-yield-point steel plate 25, the first high-yield-point steel plate 26 and the second high-yield-point steel plate 27.

Each connector 5 includes a pair of connection plates 51.

The core 2 (i.e., the low-yield-point steel plate 25, the first high-yield-point steel plate 26, and the second high-yield-point steel plate 27) is sandwiched between the pair of connection plates 51 in a direction intersecting the thickness direction of the low-yield-point steel plate 25. In the present embodiment, the pair of connection plates 51 sandwich the core 2 in the width direction. The connection plate 51 is provided perpendicular to the core 2 (i.e., the low-yield-point steel plate 25, the first high-yield-point steel plate 26, and the second high-yield-point steel plate 27).

The connection plate 51 includes a first connection segment W5 welded (i.e., connected) to the first elastic segment 25b, a second connection segment W6 welded (i.e., connected) to the second elastic segment 26b, and a third connection segment W7 welded (i.e., connected) to the third elastic segment 27b.

The first connection segment W5 is located closer to the center in the axial direction than the second connection segment W6 and the third connection segment W7. The first connection segment W5 is provided so as not to overlap the second connection segment W6 in the axial direction. The first connection segment W5 is provided so as not to overlap the third connection segment W7 in the axial direction.

The second and third connection segments W6 and W7 are provided so as to extend inside and outside the restrainer 3. The first connection segment W5 is provided inside the restrainer 3. The position of the second connection segment W6 in the axial direction is the same as the position of the third connection segment W7 in the axial direction.

The buckling-restrained brace 1D is connected to the gusset plate 108 by welding. Specifically, the pair of connection plates 51 are respectively inserted into a pair of slits (not shown) provided in the gusset plate 108. At this time, the core 2 is disposed parallel to the gusset plate 108. The end of the core 2 (i.e., the ends of the first high-yield-point steel plate 26 and the second high-yield-point steel plate 27) faces the end of the gusset plate 108 in the axial direction. In this state, the connection plate 51 is welded to the gusset plate 108.

In the buckling-restrained brace 1D according to the present embodiment, the core 2 includes the low-yield-point steel plate 25 having a first yield point, the first high-yield-point steel plate 26 having a second yield point different from the first yield point, and the second high-yield-point steel plate 27 having a third yield point different from the first yield point, and the low-yield-point steel plate 25 is sandwiched between the first high-yield-point steel plate 26 and the second low-yield-point steel plate 27. The length of the first yielding segment 25a of the low-yield-point steel plate 25 in the axial direction is different from the length of the second yielding segment 26a of the first high-yield-point steel plate 26 in the axial direction, and is different from the length of the third yielding segment 27a of the second high-yield-point steel plate 27 in the axial direction.

The core 2 includes two types of steel plates (the low-yield-point steel plate 25 and the high-yield-point steel plates 26 and 27) having different yield points. When an axial load $P_{y1}$ is applied to the core 2, the low-yield-point steel plate 25 yields prior to the high-yield-point steel plates 26, 27. A first yield displacement $\delta_{y,1}$ when the axial load $P_{y1}$ is applied to the core 2 corresponds to the yield displacement of the low-yield-point steel plate 25. Then, when the axial load applied to the core 2 becomes $P_{y2}$, the high-yield-point steel plates 26, 27 yields. A second yield displacement $\delta_{y,2}$ when the axial load $P_{y2}$ is applied to the core 2 corresponds to the yield displacement of the high-yield-point steel plates 26, 27. In a drift region where the axial load applied to the core 2 is within a range of $P_{y1}$ to $P_{y2}$, the low-yield-point steel plate 25 yields, but the high-yield-point steel plates 26 and 27 remain elastic. In the drift region, since the high-yield-point steel plates 26 and 27 remain elastic, the tangent stiffness of the entire buckling-restrained brace 1D is high, and therefore the residual drift of the buckling-restrained brace 1D is reduced.

Here, the drift region can be controlled by changing the ratio $\alpha_\delta$ of steel plate yield deformations which is a ratio of the second yield displacement $\delta_{y,2}$ when the axial load $P_{y2}$, at which yielding of the first high-yield-point steel plate 25 or the second high-yield-point steel plate 26 occurs, is applied to the core 2, to the first yield displacement $\delta_{y,1}$ when the axial load $P_{y1}$, at which yielding of the low-yield-point steel plate 25 occurs, is applied to the core 2. By making the length of the first yielding segment 25a in the axial direction be different from the length of the second yielding segment 26a in the axial direction and be different from the length of the third yielding segment 27a in the axial direction, it is possible to adjust to increase the ratio $\alpha_\delta$ of steel plate yield deformations. Specifically, the larger the ratio $\alpha_\delta$ of steel plate yield deformations, the larger the drift region. Further, the larger the length of the yielding segment of the steel plate in the axial direction, the larger the yield displacement of the steel plate. In the present embodiment, by increasing the length of the second yielding segment 26a in the axial direction and the length of the third yielding segment 27a in the axial direction, the second yield displacement $\delta_{y,2}$ is increased, compared with a case where the length of the yielding segment of the high-yield-point steel plate in the axial direction is the same as the length of the low-yield-point steel plate in the axial direction. As a result, the ratio $\alpha_\delta$ of steel plate yield deformations is increased, and thus the deformation region is increased, so that the effect of reducing the residual drift of the buckling-restrained brace 1D when receiving a plastic axial deformation due to an earthquake or the like can be enhanced.

Further, the first and second high-yield-point steel plates 26 and 27 are supported by the low-yield-point steel plate 25. Therefore, even when the length of the second yielding segment 26a in the axial direction and the length of the third yielding segment 27a in the axial direction are increased, it is possible to suppress buckling of the second yielding segment 26a and the third yielding segment 27a and to secure the strength of the buckling-restrained brace 1D.

Therefore, according to the buckling-restrained brace 1D of the present embodiment, it is possible to reduce the residual drift of the buckling-restrained brace 1D when receiving plastic axial deformation due to an earthquake or the like while securing the strength of the buckling-restrained brace 1D itself.

The first connection segment W5 is located closer to the center in the axial direction than the second connection segment W6 and the second connection segment W7.

The connector 5 is connected to the elastic segments 25b to 27b of the low-yield-point steel plate 25, the first high-yield-point steel plate 26, and the second high-yield-point steel plate 27. Since the length of the second yielding segment 26a in the axial direction and the length of the third yielding segment 27a in the axial direction are longer than the length of the first yielding segment 22a in the axial direction, the first elastic segment 25b is disposed closer to the center in the axial direction than the second elastic segment 26b and the third elastic segment 27b. By locating the first connection segment W5 closer to the center in the axial direction than the second connection segment W6 and the second connection segment W7, it is possible to efficiently connect the connector 5 to the low-yield-point steel plate 25, the first high-yield-point steel plate 26, and the second high-yield-point steel plate 27.

Sixth Embodiment

Next, a buckling-restrained brace 1E according to a sixth embodiment of the present invention will be described with reference to FIGS. 9A to 9D. In the present embodiment, the same components as those in the fifth embodiment are denoted by the same reference numerals, the description thereof will be omitted, and only the different parts will be described.

Figure 9A:
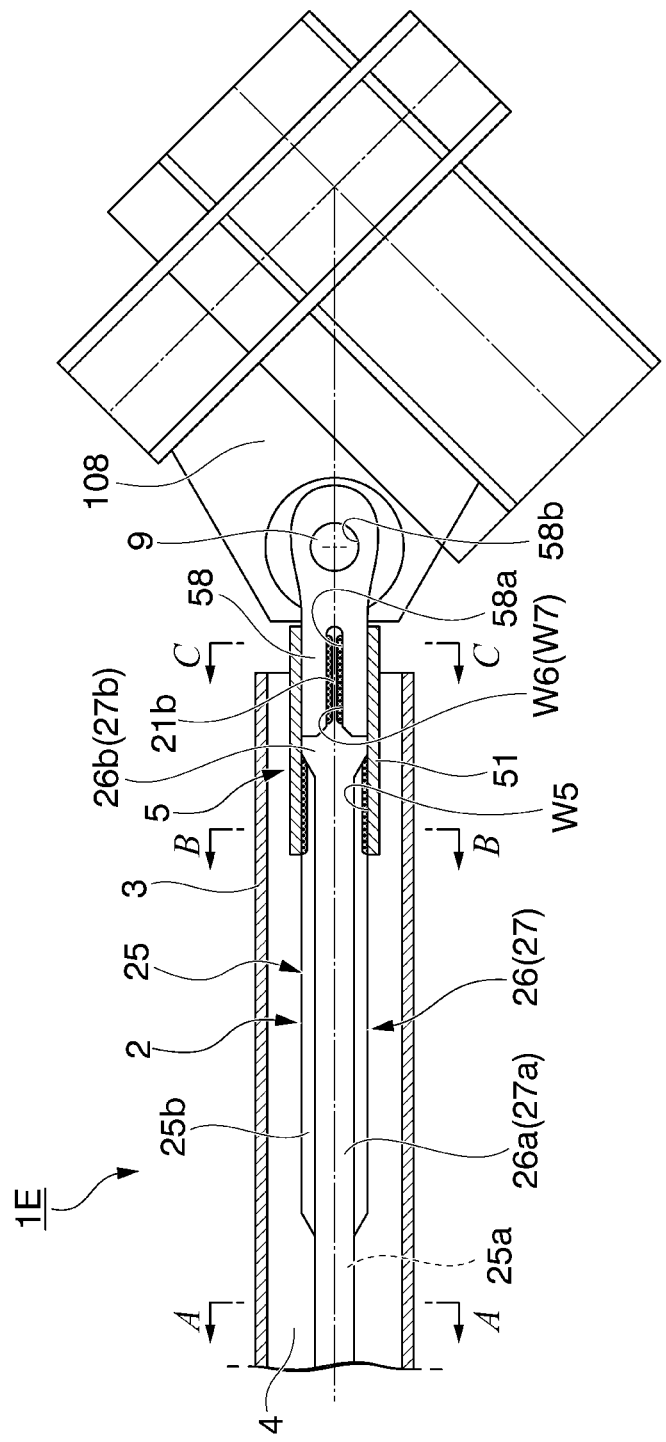
FIG. 9A is a front view of an end segment on one side of a buckling-restrained brace according to a sixth embodiment of the present invention.
Figure 9B:
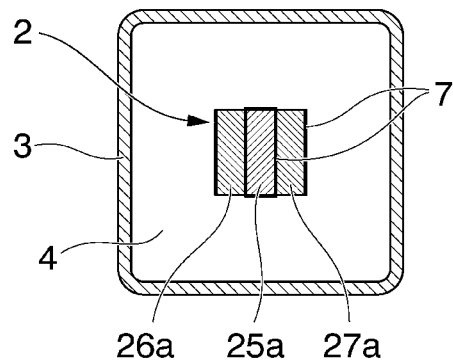
FIG. 9B is a sectional view taken along the line A-A in FIG. 9A.
Figure 9C:
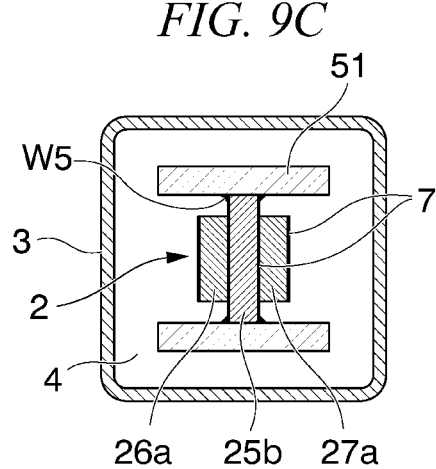
FIG. 9C is a sectional view taken along the line B-B in FIG. 9A.
Figure 9D:
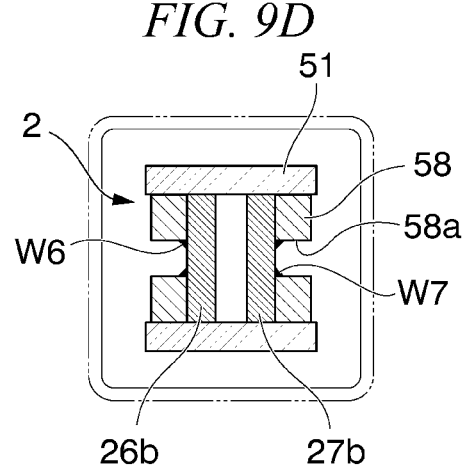
FIG. 9D is a sectional view taken along the line C-C in FIG. 9A.

FIG. 9A is a front view of an end segment on one side of the buckling-restrained brace 1E, FIG. 9B is a sectional view taken along the line A-A in FIG. 9A, FIG. 9C is a sectional view taken along the line B-B in FIG. 9A, and FIG. 9D is a sectional view taken along the line C-C in FIG. 9A.

The present embodiment differs from the fifth embodiment in that the buckling-restrained brace 1E is connected to the gusset plate 108 using a pinned connection.

In the present embodiment, each connector 5 includes a pair of clevis plates 58, in addition to the pair of connection plates 51.

One of the pair of clevis plates 58 is provided at a protruding segment of the first high-yield-point steel plate 26 protruding from the low-yield-point steel plate 25, and the other of the pair of clevis plates 58 is provided at a protruding segment of the second high-yield-point steel plate 27 protruding from the low-yield-point steel plate 25. The core 2 (i.e., the first high-yield-point steel plate 26 and the second high-yield-point steel plate 27) is sandwiched between the pair of clevis plates 58 in the thickness direction. The clevis plates 58 are arranged parallel to the first high-yield-point steel plate 26 and the second high-yield-point steel plate 27. The clevis plate 58 is provided perpendicular to the connection plate 51.

The clevis plate 58 is provided so as to extend inside and outside the restrainer 3. The clevis plate 58 is provided so as to protrude further outside in the axial direction than the first high-yield-point steel plate 26 and the second high-yield-point steel plate 27. A gap is formed between protruding segments of the pair of clevis plates 58 protruding from the first high-yield-point steel plate 26 and the second high-yield-point steel plate 27, and the gusset plate 108 is inserted into the gap. A through-hole 58b is formed in the protruding segment of the clevis plate 58, and a support pin 9 is inserted through the through-hole 58b.

A slit 58a is formed in the clevis plate 58. The slit 58a is provided in a segment of the clevis plate 58 overlapping the first high-yield-point steel plate 26 or the second high-yield-point steel plate 27. The slit 58a extends, from an inside end of the clevis plate 58 in the axial direction, to a position corresponding to the end of the first high-yield-point steel plate 26 or the second high-yield-point steel plate 27 in the axial direction. The slit 58a is provided in the center of the clevis plate 58 in the width direction. The slit 58a is used to facilitate welding of the clevis plate 58 to the first high-yield-point steel plate 26 or the second high-yield-point steel plate 27.

The core 2 and the pair of clevis plates 58 are sandwiched between the pair of connection plates 51 in the width direction. As shown in FIG. 9D, the pair of connection plates 51 and the pair of clevis plates 58 are disposed so as to form a rectangular shape when seen in the axial direction. The clevis plates 58 are welded (i.e., connected) to the connection plates 51.

The connection plate 51 includes a first connection segment W5 welded to the first elastic segment 25b of the low-yield-point steel plate 25. One of the pair of clevis plates 58 includes a second connection segment W6 provided inside the slit 58a and welded to the second elastic segment 26b of the first high-yield-point steel plate 26. The other of the pair of clevis plates 58 includes a third connection segment W7 provided inside the slit 58a and welded to the third elastic segment 27b of the second high-yield-point steel plate 27.

The buckling-restrained brace 1E is connected to the gusset plate 108 using a pinned connection. Specifically, the gusset plate 108 is inserted between the protruding segments of the pair of clevis plates 58. At this time, the core 2 is disposed parallel to the gusset plate 108. The end of the core 2 (i.e., the ends of the first high-yield-point steel plate 26 and the second high-yield-point steel plate 27) faces the end of the gusset plate 108 in the axial direction. The clevis plate 58 is disposed so as to span between the gusset plate 108 and the first high-yield-point steel plate 26 or the second high-yield-point steel plate 27. In this state, the support pin 9 is inserted through the through-holes 58b formed in the pair of clevis plates 58 and a through-hole (not shown) formed in the gusset plate 108. Thereby, the buckling-restrained brace 1E is rotatably pinned to the gusset plate 108.

In the present embodiment, it is possible to obtain the same effect as that of the fifth embodiment. That is, according to the buckling-restrained brace 1E of the present embodiment, it is possible to reduce the residual drift of the buckling-restrained brace 1E when receiving plastic axial deformation due to an earthquake or the like while securing the strength of the buckling-restrained brace 1E itself.

Further, the buckling-restrained brace 1E of the present embodiment can be connected to the gusset plate 108 using a pinned connection.

The present invention is not limited to the embodiments described above with reference to the drawings, and various modified examples in a range not departing from the concept of the present invention are included therein.

In the above-described embodiments, by making the width of the first yield segment 21a smaller than the width of the first elastic segment 21b, the axial strength of the first yielding segment 21a is smaller than the axial strength of the first elastic segments 21b, but the present invention is not limited thereto. For example, stiffener plates may be welded to both end segments of the high-yield-point steel plate 21 in the axial direction. In this case, the cross-sectional area of the first elastic segments 21b is increased, and thus the axial strength of the first yielding segment 21a is smaller than the axial strength of the first elastic segments 21b. Similarly, stiffener plates may be welded to both end segments of the first low-yield-point steel plate 22 in the axial direction, such that the axial strength of the second yielding segment 22a is smaller than the axial strength of the second elastic segments 22b. Stiffener plates may be welded to both end segments of the second low-yield-point steel plate 23 in the axial direction, such that the axial strength of the third yielding segment 23a is smaller than the axial strength of the third elastic segments 23b.

In the above-described embodiments, a steel pipe is used as the restrainer 3, but the present invention is not limited thereto. The restrainer 3 may be made of wood. In this case, for example, the wooden restrainer 3 may be formed of a pair of restraining members which come into direct contact with the core 2. In this case, an infill material is not provided inside the restrainer 3. The pair of restraining members restrict the displacement of the core 2 in the thickness direction. Further, a regulating member is provided between the pair of restraining members to restrict the displacement of the core 2 in the width direction. Thereby, the deformation of the core 2 in a direction other than the axial direction is restricted.

In the first and second embodiments, the high-yield-point steel plate 21 may be provided such that the first yielding segment 21a protrudes from the restrainer 3.

In the fifth and sixth embodiments, the first high-yield-point steel plate 26 may be provided such that the second yielding segment 26a protrudes from the restrainer 3, and the second high-yield-point steel plate 27 may be provided such that the third yielding segment 27a protrudes from the restrainer 3. In this case, a supporting member may be provided at protruding segments of the second yielding segment 26a and the third yielding segment 27a protruding from the restrainer 3 for supporting the protruding segments of the second yielding segment 26a and the third yielding segment 27a.

The buckling-restrained brace 1D, 1E according to the fifth and sixth embodiments may be connected to the gusset plate 108 using a bolted connection. For example, by adopting the connectors 5 of the third embodiment to the buckling-restrained brace 1D of the fifth embodiment, it is possible to connect the buckling-restrained brace 1D to the gusset plate 108 using a bolted connection.

In the above-described embodiments, the frame 103 of the seismic force-resisting structure 100 is formed of two vertical frame members 106 (for example, steel columns) and two horizontal frame members 107 (for example, steel beams), but the present invention is not limited thereto. The frame 103 may be formed by a cylindrical steel pipe.

In addition, it is possible to replace the constituent elements in the above-described embodiments with well-known constituent elements as appropriate without departing from the spirit of the present invention, and the above-described modified examples may be appropriately combined.

Industrial Applicability

The present invention can be applied to a buckling-restrained brace and a seismic force-resisting structure.

REFERENCE SIGNS LIST 1, 1A, 1B, 1C, 1D, 1E Buckling-restrained brace
2 Core
3 Restrainer
5 Connector
6 Spacer
21 High-yield-point steel plate (first steel plate)
21a First yielding segment
22 First low-yield-point steel plate (second steel plate)
22a Second yielding segment
23 Second low-yield-point steel plate (third steel plate)
23a Third yielding segment
25 Low-yield-point steel plate (first steel plate)
25a First yielding segment
26 First high-yield-point steel plate (second steel plate)
26a Second yielding segment
27 Second high-yield-point steel plate (third steel plate)
27a Third yielding segment
51 Connection plate
100 Seismic force-resisting structure
103 Frame
108 Gusset plate
W1 First connection segment
W2 Second connection segment
W3 Third connection segment
W5 First connection segment
W6 Second connection segment
W7 Third connection segment

The invention claimed is:

1. A buckling-restrained brace, comprising:
a core extending in an axial direction; and
a restrainer encasing the core from an outer side thereof in a state where both end segments of the core in the axial direction protrude from the restrainer,
wherein the core includes a first steel plate having a first yield point, a second steel plate having a second yield point different from the first yield point, and a third steel plate having a third yield point different from the first yield point, the first steel plate being sandwiched between the second steel plate and the third steel plate,
the first steel plate includes a first yielding segment provided in a center segment of the first steel plate in the axial direction and having an axial strength smaller than an axial strength of both end segments of the first steel plate in the axial direction,
the second steel plate includes a second yielding segment provided in a center segment of the second steel plate in the axial direction and having an axial strength smaller than an axial strength of both end segments of the second steel plate in the axial direction,
the third steel plate includes a third yielding segment provided in a center segment of the third steel plate in the axial direction and having an axial strength smaller than an axial strength of both end segments of the third steel plate in the axial direction, and
a length of the first yielding segment in the axial direction is different from a length of the second yielding segment in the axial direction, and is different from a length of the third yielding segment in the axial direction.

2. The buckling-restrained brace according to claim 1, wherein:
the first yield point is higher than the second yield point, and is higher than the third yield point; and
the length of the first yielding segment in the axial direction is longer than the length of the second yielding segment in the axial direction, and is longer than the length of the third yielding segment in the axial direction.

3. The buckling-restrained brace according to claim 2, wherein the length of the first yielding segment in the axial direction is longer than the length of the second yielding segment in the axial direction, and is longer than the length of the third yielding segment in the axial direction such that a ratio of steel plate yield deformations is increased compared with a case where the length of the first yielding segment in the axial direction is the same as the length of the second yielding segment in the axial direction and is the same as the length of the third yielding segment in the axial direction, the ratio of steel plate yield deformations being a ratio of a second yield displacement when an axial load, at which yielding of the first steel plate occurs, is applied to the core to a first yield displacement when an axial load, at which yielding of the second steel plate or the third steel plate occurs, is applied to the core.

4. The buckling-restrained brace according to claim 2, wherein the first steel plate is provided such that the first yielding segment protrudes from the restrainer.

5. The buckling-restrained brace according to claim 1, wherein:
the first yield point is lower than the second yield point, and is lower than the third yield point; and
the length of the first yielding segment in the axial direction is shorter than the length of the second yielding segment in the axial direction, and is shorter than the length of the third yielding segment in the axial direction.

6. The buckling-restrained brace according to claim 5, wherein the length of the first yielding segment in the axial direction is shorter than the length of the second yielding segment in the axial direction, and is shorter than the length of the third yielding segment in the axial direction such that a ratio of steel plate yield deformations is increased compared with a case where the length of the first yielding segment in the axial direction is the same as the length of the second yielding segment in the axial direction and is the same as the length of the third yielding segment in the axial direction, the ratio of steel plate yield deformations being a ratio of a second yield displacement when an axial load, at which yielding of the second steel plate or the third steel plate occurs, is applied to the core to a first yield displacement when an axial load, at which yielding of the first steel plate occurs, is applied to the core.

7. The buckling-restrained brace according to claim 5, wherein the second steel plate is provided such that the second yielding segment protrudes from the restrainer, and the third steel plate is provided such that the third yielding segment protrudes from the restrainer.

8. The buckling-restrained brace according to claim 1, wherein the first yielding segment has a width smaller than a width of both end segments of the first steel plate in the axial direction, the second yielding segment has a width smaller than a width of both end segments of the second steel plate in the axial direction, and the third yielding segment has a width smaller than a width of both end segments of the third steel plate in the axial direction.

9. The buckling-restrained brace according to claim 1, further comprising connectors which are provided to both end segments of the core, wherein each of the connectors includes a first connection segment connected to the first steel plate, a second connection segment connected to the second steel plate, and a third connection segment connected to the third steel plate.

10. The buckling-restrained brace according to claim 2, further comprising connectors which are provided to both end segments of the core, wherein each of the connectors includes a first connection segment connected to the first steel plate, a second connection segment connected to the second steel plate, and a third connection segment connected to the third steel plate,
wherein the second connection segment and the third connection segment are located closer to a center in the axial direction than the first connection segment.

11. The buckling-restrained brace according to claim 5, further comprising connectors which are provided to both end segments of the core, wherein each of the connectors includes a first connection segment connected to the first steel plate, a second connection segment connected to the second steel plate, and a third connection segment connected to the third steel plate,
wherein the first connection segment is located closer to a center in the axial direction than the second connection segment and the third connection segment.

12. The buckling-restrained brace according to claim 9, wherein the first connection segment is provided so as not to overlap the second connection segment in the axial direction, and is provided so as not to overlap the third connection segment in the axial direction.

13. The buckling-restrained brace according to claim 9, wherein each of the connectors includes a pair of connection plates sandwiching the first steel plate, the second steel plate, and the third steel plate in a direction intersecting a thickness direction of the first steel plate.

14. The buckling-restrained brace according to claim 1, wherein:
the second yield point is the same as the third yield point; and
the length of the second yielding segment in the axial direction is the same as the length of the third yielding segment in the axial direction.

15. The buckling-restrained brace according to claim 1, wherein the second steel plate and the third steel plate are symmetric in a thickness direction of the first steel plate, with respect to the thickness-center of the first steel plate in the thickness direction of the first steel plate.

16. The buckling-restrained brace according to claim 1, wherein the first steel plate, the second steel plate, and the third steel plate are arranged parallel to each other.

17. The buckling-restrained brace according to claim 1, further comprising a spacer provided between the second steel plate and the third steel plate.

18. A seismic force-resisting structure, comprising:
a frame;
a plurality of gusset plates projecting inward from the frame; and
the buckling-restrained brace according to claim 1,
wherein the buckling-restrained brace spans between the plurality of gusset plates, and both end segments of the core are connected to the plurality of gusset plates using a welded, pinned, or bolted connection.

\* \* \* \* \*